United States Patent
Ben-Shmuel et al.

(10) Patent No.: US 11,523,474 B2
(45) Date of Patent: Dec. 6, 2022

(54) ELECTROMAGNETIC HEATING

(71) Applicant: GOJI LIMITED, Hamilton (BM)

(72) Inventors: Eran Ben-Shmuel, Savyon (IL); Alexander Bilchinsky, Monosson-Yahud (IL)

(73) Assignee: GOJI LIMITED, Hamilton (BM)

( * ) Notice: Subject to any disclaimer, the term of this patent is extended or adjusted under 35 U.S.C. 154(b) by 819 days.

(21) Appl. No.: 16/506,249

(22) Filed: Jul. 9, 2019

(65) Prior Publication Data
US 2019/0335550 A1 Oct. 31, 2019

Related U.S. Application Data

(63) Continuation of application No. 12/563,180, filed on Sep. 21, 2009, now abandoned, which is a continuation of application No. 12/222,948, filed on Aug. 20, 2008, now Pat. No. 8,207,479, which is a
(Continued)

(51) Int. Cl.
*H05B 6/70* (2006.01)
*H05B 6/66* (2006.01)
*H05B 6/64* (2006.01)

(52) U.S. Cl.
CPC ............ *H05B 6/666* (2013.01); *H05B 6/647* (2013.01); *H05B 6/705* (2013.01); *H05B 2206/044* (2013.01); *Y02B 40/00* (2013.01)

(58) Field of Classification Search
CPC .. H05B 6/6402; H05B 6/6435; H05B 6/6447; H05B 6/645; H05B 6/6455; H05B 6/647; H05B 6/666; H05B 6/686; H05B 6/687; H05B 6/688; H05B 6/70; H05B 6/702; H05B 2206/044; H05B 2206/045; H05B 2206/046; H05B 6/705; H05B 6/72; H05B 6/80; H05B 6/802; H05B 6/808; Y02B 40/00
USPC ....... 219/678, 695, 697, 702, 715–718, 728, 219/746–748, 750, 756
See application file for complete search history.

(56) References Cited

U.S. PATENT DOCUMENTS

| 2,489,337 A | 11/1949 | Sperling |
| 2,543,130 A | 2/1951 | Robertson |
| 2,593,067 A | 4/1952 | Spencer |

(Continued)

FOREIGN PATENT DOCUMENTS

| CN | 1496665 | 5/2004 |
| CN | 1968609 | 5/2007 |

(Continued)

OTHER PUBLICATIONS

Notice of Opposition from the European Patent Office, Ref. P55775EP3, Application No. 15192062.6-1202, EP Patent No. 3010309, 72 pages, dated Jan. 15, 2020.
(Continued)

*Primary Examiner* — Hung D Nguyen
(74) *Attorney, Agent, or Firm* — Finnegan, Henderson, Farabow, Garrett & Dunner LLP

(57) ABSTRACT

An electromagnetic heater for heating an irregularly shaped object, including:
 a cavity within which an object is to be placed;
 at least one feed which feeds UHF or microwave energy into the cavity; and
 a controller that controls one or more characteristics of the cavity or energy to assure that the UHF or microwave energy is deposited uniformly in the object within ±30% over at least 80% of the volume of the object.

20 Claims, 21 Drawing Sheets

Related U.S. Application Data continuation of application No. PCT/IL2007/000236, filed on Feb. 21, 2007.

(60) Provisional application No. 60/775,231, filed on Feb. 21, 2006, provisional application No. 60/806,860, filed on Jul. 10, 2006.

(56) References Cited

U.S. PATENT DOCUMENTS

| | | |
|---|---|---|
| 2,895,828 A | 7/1959 | Kamide |
| 2,917,739 A | 12/1959 | Halpern |
| 3,019,399 A | 1/1962 | Lanciani et al. |
| 3,151,325 A | 9/1964 | Kompfner |
| 3,231,892 A | 1/1966 | Matson et al. |
| 3,633,538 A | 1/1972 | Hoeflin |
| 3,681,652 A | 8/1972 | Domenichini et al. |
| 3,767,884 A | 10/1973 | Osepchuk et al. |
| 3,806,689 A | 4/1974 | Kegereis et al. |
| 3,936,627 A | 2/1976 | Fitzmayer |
| 3,985,993 A | 10/1976 | Imberg et al. |
| 4,035,599 A | 7/1977 | Kashyap et al. |
| 4,081,647 A | 3/1978 | Torrey |
| 4,115,680 A | 9/1978 | Moore |
| 4,137,441 A | 1/1979 | Bucksbaum |
| 4,146,768 A | 3/1979 | Orke et al. |
| 4,165,454 A | 8/1979 | Carlsson et al. |
| 4,196,332 A | 4/1980 | MacKay B et al. |
| 4,210,795 A | 7/1980 | Lentz |
| 4,250,628 A | 2/1981 | Smith et al. |
| 4,271,848 A | 6/1981 | Turner et al. |
| 4,279,722 A | 7/1981 | Kirkbridge |
| 4,289,945 A | 9/1981 | Kristof |
| 4,297,557 A | 10/1981 | Tyler et al. |
| 4,336,435 A | 6/1982 | Kashyap et al. |
| 4,342,035 A | 7/1982 | Anderson et al. |
| 4,342,896 A | 8/1982 | Teich |
| 4,354,153 A | 10/1982 | Lentz |
| 4,371,770 A | 2/1983 | Gilliatt |
| 4,377,733 A | 3/1983 | Yamaguchi et al. |
| 4,418,262 A | 11/1983 | Noda |
| 4,431,888 A | 2/1984 | Simpson |
| 4,434,341 A | 2/1984 | Busby |
| 4,441,002 A | 4/1984 | Teich et al. |
| 4,447,693 A | 5/1984 | Buck |
| 4,464,554 A | 8/1984 | Bakanowski et al. |
| 4,471,194 A | 9/1984 | Hosokawa et al. |
| 4,475,024 A | 10/1984 | Tateda |
| 4,485,285 A | 11/1984 | Machesney |
| 4,488,027 A | 12/1984 | Dudley et al. |
| 4,507,530 A | 3/1985 | Smith |
| 4,508,948 A | 4/1985 | Carlson |
| 4,517,429 A | 5/1985 | Horinouchi |
| 4,520,250 A | 5/1985 | Ishihara et al. |
| 4,568,810 A | 2/1986 | Carmean |
| 4,589,423 A | 5/1986 | Turner |
| 4,596,915 A | 6/1986 | Simpson |
| 4,602,141 A | 7/1986 | Naito et al. |
| 4,629,849 A | 12/1986 | Mizutani et al. |
| 4,695,694 A | 9/1987 | Hill et al. |
| 4,794,218 A | 12/1988 | Nakano et al. |
| 4,795,871 A | 1/1989 | Strattan et al. |
| 4,822,968 A | 4/1989 | Chin |
| 4,855,555 A | 8/1989 | Adams et al. |
| 4,897,151 A | 1/1990 | Killackey et al. |
| 4,931,798 A | 6/1990 | Kogo |
| 4,963,709 A | 10/1990 | Kimrey, Jr. |
| 5,008,506 A | 4/1991 | Asmussen et al. |
| 5,036,171 A | 7/1991 | Kim et al. |
| 5,036,172 A | 7/1991 | Kokkeler et al. |
| 5,066,503 A | 11/1991 | Rouzi |
| 5,074,200 A | 12/1991 | Rouzi |
| 5,140,121 A | 8/1992 | Pesheck et al. |
| 5,146,059 A | 9/1992 | Seog Tae |
| 5,191,182 A | 3/1993 | Galorme et al. |
| 5,202,095 A | 4/1993 | Houchin et al. |
| 5,251,645 A | 10/1993 | Fenn |
| 5,284,144 A | 2/1994 | Delannoy et al. |
| 5,293,019 A | 3/1994 | Lee |
| 5,321,222 A | 6/1994 | Bible et al. |
| 5,321,897 A | 6/1994 | Holst et al. |
| 5,441,532 A | 8/1995 | Fenn |
| 5,451,751 A | 9/1995 | Takimoto et al. |
| 5,468,940 A | 11/1995 | Kang |
| 5,503,150 A | 4/1996 | Evans |
| 5,512,736 A | 4/1996 | Kang et al. |
| 5,521,360 A | 5/1996 | Johnson et al. |
| 5,558,800 A | 9/1996 | Page |
| 5,616,268 A | 4/1997 | Carr |
| 5,632,921 A | 5/1997 | Risman et al. |
| 5,648,038 A | 7/1997 | Fathi et al. |
| 5,698,128 A | 12/1997 | Sakai et al. |
| 5,721,286 A | 2/1998 | Lauf et al. |
| 5,789,724 A | 8/1998 | Lerssen et al. |
| 5,798,395 A | 8/1998 | Lauf et al. |
| 5,804,801 A | 9/1998 | Lauf et al. |
| 5,812,393 A | 9/1998 | Drucker |
| 5,818,649 A | 10/1998 | Anderson |
| 5,828,040 A | 10/1998 | Risman |
| 5,828,042 A | 10/1998 | Choi et al. |
| 5,834,744 A | 11/1998 | Risman |
| 5,837,978 A | 11/1998 | Hatzakis, Jr. et al. |
| 5,873,254 A | 2/1999 | Arav |
| 5,877,479 A | 3/1999 | Yu |
| 5,883,801 A | 3/1999 | Drucker et al. |
| 5,889,402 A | 3/1999 | Kumatoriya et al. |
| 5,927,265 A | 7/1999 | McKee et al. |
| 5,942,144 A | 8/1999 | Lee |
| 5,958,278 A | 9/1999 | Engebritson et al. |
| 5,961,871 A | 10/1999 | Bible et al. |
| 5,977,532 A | 11/1999 | Ekemar |
| 5,981,927 A | 11/1999 | Osepchuk et al. |
| 5,981,928 A | 11/1999 | Lee |
| 5,986,249 A | 11/1999 | Yoshino et al. |
| 5,998,775 A | 12/1999 | Sung |
| 6,060,701 A | 5/2000 | McKee et al. |
| 6,096,361 A | 8/2000 | Yamane et al. |
| 6,104,018 A | 8/2000 | Varma et al. |
| 6,114,677 A | 9/2000 | Idomoto |
| 6,157,014 A | 12/2000 | Goranson |
| 6,166,551 A | 12/2000 | Scott et al. |
| 6,169,277 B1 | 1/2001 | Feher et al. |
| 6,172,348 B1 | 1/2001 | Yoshino et al. |
| 6,191,402 B1 | 2/2001 | Ekemar |
| 6,222,170 B1 | 4/2001 | Tucker et al. |
| 6,225,940 B1 | 5/2001 | Ohlsen |
| 6,249,710 B1 | 6/2001 | Drucker et al. |
| 6,252,206 B1 | 6/2001 | Leukhardt, III et al. |
| 6,262,406 B1 | 7/2001 | McKee et al. |
| 6,263,830 B1 | 7/2001 | Kamarehi et al. |
| 6,274,859 B1 | 8/2001 | Yoshino et al. |
| 6,320,165 B1 | 11/2001 | Ovadia |
| 6,320,169 B1 | 11/2001 | Clothier |
| 6,320,171 B1 | 11/2001 | Kim |
| 6,384,392 B1 | 5/2002 | Lee et al. |
| 6,403,939 B1 | 6/2002 | Fagrell |
| 6,444,966 B2 | 9/2002 | Mukumoto et al. |
| 6,462,320 B1 | 10/2002 | Fuls et al. |
| 6,476,766 B1 | 11/2002 | Cohen |
| 6,487,950 B2 | 12/2002 | Samland |
| 6,537,492 B1 | 3/2003 | Søgaard |
| 6,559,882 B1 | 5/2003 | Kerchner |
| 6,563,097 B2 | 5/2003 | Taino et al. |
| 6,576,879 B1 | 6/2003 | Hoh |
| 6,586,714 B2 | 7/2003 | Kawamura et al. |
| 6,590,192 B2 | 7/2003 | Taino et al. |
| 6,606,483 B1 | 8/2003 | Baker et al. |
| 6,614,011 B2 | 9/2003 | Omori et al. |
| 6,638,475 B1 | 10/2003 | Lagunas-Solar et al. |
| 6,657,173 B2 | 12/2003 | Flugstad et al. |
| 6,674,056 B2 | 1/2004 | Lee |
| 6,680,467 B1 | 1/2004 | Whipple, Jr. |
| 6,686,567 B1 | 2/2004 | Hwang |
| 6,720,541 B2 | 4/2004 | Watanabe et al. |

(56) References Cited

U.S. PATENT DOCUMENTS

| | | |
|---|---|---|
| 6,770,859 B2 | 8/2004 | Kang |
| 6,812,442 B2 | 11/2004 | Kim et al. |
| 6,812,443 B2 | 11/2004 | Noda et al. |
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |
| 6,880,545 B2 | 4/2005 | Heber et al. |
| 6,884,979 B1 | 4/2005 | Törngren et al. |
| 6,914,226 B2 | 7/2005 | Ottaway |
| 6,917,023 B2 | 7/2005 | Hayes et al. |
| 6,927,374 B2 | 8/2005 | Hu et al. |
| 6,953,919 B2 | 10/2005 | Clothier |
| 6,982,401 B2 | 1/2006 | Hu et al. |
| 7,015,443 B2 | 3/2006 | Whipple, Jr. |
| 7,030,347 B2 | 4/2006 | Lee et al. |
| 7,053,346 B2 | 5/2006 | Cheng et al. |
| 7,053,348 B1 | 5/2006 | Terada et al. |
| 7,055,518 B2 | 6/2006 | McFadden et al. |
| 7,060,953 B2 | 6/2006 | Ishikawa et al. |
| 7,070,595 B2 | 7/2006 | Ormsby et al. |
| 7,078,661 B2 | 7/2006 | Kim et al. |
| 7,080,593 B1 | 7/2006 | Frankel |
| 7,087,872 B1 | 8/2006 | Dobie et al. |
| 7,091,460 B2 | 8/2006 | Kinzer |
| 7,096,221 B2 | 8/2006 | Nakano |
| 7,105,787 B2 | 9/2006 | Clemen, Jr. |
| 7,105,789 B2 | 9/2006 | Ekemar |
| 7,109,457 B2 | 9/2006 | Kinzer |
| 7,145,119 B1 | 12/2006 | Kim et al. |
| 7,166,824 B2 | 1/2007 | Kanzaki et al. |
| 7,199,341 B2 | 4/2007 | Kaneko et al. |
| 7,207,486 B1 | 4/2007 | Bennett |
| 7,208,710 B2 | 4/2007 | Gregoire et al. |
| 7,235,763 B2 | 6/2007 | Christiaansen et al. |
| 7,258,881 B2 | 8/2007 | Jones et al. |
| 7,360,533 B2 | 4/2008 | McFadden |
| 7,361,866 B2 | 4/2008 | Chun |
| 7,372,209 B2 | 5/2008 | Espiau et al. |
| 7,388,180 B2 | 6/2008 | Kim et al. |
| 7,409,311 B2 | 8/2008 | Imgram et al. |
| 7,473,869 B2 | 1/2009 | Chun |
| 7,490,538 B2 | 2/2009 | Lowell et al. |
| 7,612,315 B2 | 11/2009 | Corradini |
| 7,626,468 B2 | 12/2009 | Staines |
| 7,629,497 B2 | 12/2009 | Pringle |
| 7,629,921 B1 | 12/2009 | Manry et al. |
| 8,207,479 B2 | 6/2012 | Ben-Shmuel et al. |
| 8,759,729 B2 | 6/2014 | Ben-Shmuel et al. |
| 2001/0015353 A1 | 8/2001 | Brennan |
| 2001/0020616 A1 | 9/2001 | Drozd et al. |
| 2002/0018138 A1 | 2/2002 | Yoshiro |
| 2002/0162836 A1 | 11/2002 | Taino et al. |
| 2002/0175163 A1 | 11/2002 | Fagrell |
| 2003/0047559 A1 | 3/2003 | Watanabe et al. |
| 2003/0068414 A1 | 4/2003 | Ito |
| 2003/0106891 A1 | 6/2003 | Fagrell et al. |
| 2003/0183972 A1 | 10/2003 | Weber et al. |
| 2004/0069776 A1 | 4/2004 | Fagrell et al. |
| 2004/0074401 A1 | 4/2004 | McMaster et al. |
| 2004/0106917 A1 | 6/2004 | Ormsby et al. |
| 2004/0134904 A1 | 7/2004 | Clemen, Jr. |
| 2004/0149736 A1 | 8/2004 | Clothier |
| 2004/0206755 A1 | 10/2004 | Hadinger |
| 2004/0211765 A1 | 10/2004 | McFadden |
| 2004/0216732 A1 | 11/2004 | McFadden |
| 2004/0232140 A1 | 11/2004 | Kanzaki et al. |
| 2005/0080373 A1 | 4/2005 | Wang |
| 2005/0092314 A1 | 5/2005 | Rabas et al. |
| 2005/0092844 A1 | 5/2005 | Zhang et al. |
| 2005/0139686 A1 | 6/2005 | Helmer et al. |
| 2005/0178841 A1 | 8/2005 | Jones, II et al. |
| 2005/0218124 A1 | 10/2005 | Jennings et al. |
| 2005/0230385 A1 | 10/2005 | Lee et al. |
| 2006/0006173 A1 | 1/2006 | Kim et al. |
| 2006/0049725 A1 | 3/2006 | Simon |
| 2006/0049981 A1 | 3/2006 | Merkel et al. |
| 2006/0186115 A1 | 8/2006 | Joines et al. |
| 2006/0259547 A1 | 11/2006 | Bogatin et al. |
| 2006/0278710 A1 | 12/2006 | Park et al. |
| 2006/0289499 A1 | 12/2006 | Chun |
| 2006/0289508 A1 | 12/2006 | Kim |
| 2006/0289526 A1 | 12/2006 | Takizaki et al. |
| 2007/0007279 A1 | 1/2007 | Chun et al. |
| 2007/0007348 A1 | 1/2007 | Shah |
| 2007/0012690 A1 | 1/2007 | Sim et al. |
| 2007/0012789 A1 | 1/2007 | Hartney et al. |
| 2007/0039940 A1 | 2/2007 | Kim et al. |
| 2007/0137633 A1 | 6/2007 | McFadden |
| 2007/0215608 A1 | 9/2007 | Yoshino et al. |
| 2007/0215612 A1 | 9/2007 | Hicks et al. |
| 2007/0221668 A1 | 9/2007 | Baarman et al. |
| 2007/0251941 A1 | 11/2007 | Givens |
| 2007/0272684 A1 | 11/2007 | Lee |
| 2007/0278218 A1 | 12/2007 | Claesson et al. |
| 2008/0047948 A1 | 2/2008 | Rosenbloom et al. |
| 2008/0047959 A1 | 2/2008 | Moriya et al. |
| 2008/0087662 A1 | 4/2008 | Takizaki et al. |
| 2008/0105136 A1 | 5/2008 | McFadden |
| 2008/0105675 A1 | 5/2008 | Choi et al. |
| 2008/0106483 A1 | 5/2008 | McFadden et al. |
| 2008/0160967 A1 | 7/2008 | Narasimhan et al. |
| 2008/0193614 A1 | 8/2008 | Greiner et al. |
| 2008/0206420 A1 | 8/2008 | McFadden |
| 2008/0264269 A1 | 10/2008 | Sterzel et al. |
| 2008/0280000 A1 | 11/2008 | Breunig et al. |
| 2008/0290087 A1 | 11/2008 | Ben-Shmuel et al. |
| 2008/0290178 A1 | 11/2008 | Reynolds et al. |
| 2008/0296284 A1 | 12/2008 | McFadden et al. |
| 2009/0014315 A1 | 1/2009 | Chen |
| 2009/0045191 A1 | 2/2009 | Ben-Shmuel et al. |
| 2009/0057302 A1 | 3/2009 | Ben-Shmuel et al. |
| 2009/0071110 A1 | 3/2009 | Gonze et al. |
| 2009/0236333 A1 | 9/2009 | Ben-Shmuel et al. |
| 2009/0236334 A1 | 9/2009 | Ben-Shmuel et al. |
| 2009/0236335 A1 | 9/2009 | Ben-Shmuel et al. |
| 2009/0256706 A1 | 10/2009 | Brown |
| 2009/0274802 A1 | 11/2009 | Kling et al. |
| 2010/0006564 A1 | 1/2010 | Ben-Shmuel et al. |
| 2010/0123001 A1 | 5/2010 | Park |
| 2010/0155392 A1 | 6/2010 | Nordh et al. |
| 2010/0176121 A1 | 7/2010 | Nobue et al. |
| 2010/0237067 A1 | 9/2010 | Nordh et al. |
| 2010/0252551 A1 | 10/2010 | Nordh et al. |
| 2011/0017728 A1 | 1/2011 | Ben-Shmuel et al. |
| 2011/0031240 A1 | 2/2011 | Ben-Shmuel et al. |
| 2012/0067872 A1 | 3/2012 | Libman et al. |
| 2012/0267361 A1 | 10/2012 | Ben-Shmuel et al. |

FOREIGN PATENT DOCUMENTS

| | | |
|---|---|---|
| DE | 3326514 A1 | 1/1984 |
| DE | 102007025245 | 10/2007 |
| DE | 102007025262 | 10/2007 |
| DE | 102007025263 | 10/2007 |
| DE | 102007025264 | 10/2007 |
| DE | 102007035357 | 2/2009 |
| DE | 102007035359 | 2/2009 |
| DE | 102007051638 | 8/2009 |
| EP | 0 268 379 A1 | 5/1988 |
| EP | 0 296 527 A2 | 12/1988 |
| EP | 0 429 822 B1 | 6/1991 |
| EP | 0 268 379 B1 | 8/1992 |
| EP | 0 615 763 A2 | 9/1994 |
| EP | 0788296 A1 | 8/1997 |
| EP | 1 174 667 A1 | 1/2002 |
| EP | 1 241 923 A1 | 9/2002 |
| EP | 0 752 195 B1 | 2/2003 |
| EP | 1333012 A1 | 8/2003 |
| EP | 1 349 234 A2 | 10/2003 |
| EP | 1 447 632 A1 | 8/2004 |
| EP | 0 753 240 B1 | 10/2004 |
| EP | 0 934 681 B1 | 2/2005 |

(56) References Cited

FOREIGN PATENT DOCUMENTS

| | | |
|---|---|---|
| EP | 1 515 102 A1 | 3/2005 |
| EP | 1587345 A2 | 10/2005 |
| EP | 1 708 118 A2 | 10/2006 |
| EP | 1 987 288 B1 | 11/2008 |
| EP | 2 053 315 A2 | 4/2009 |
| EP | 2 098 788 A2 | 9/2009 |
| EP | 2 528 413 A2 | 11/2012 |
| GB | 1 465 106 | 2/1977 |
| GB | 2 033 587 A | 5/1980 |
| GB | 2 391 154 A | 1/2004 |
| JP | 52-014946 | 2/1977 |
| JP | 55-12551 | 1/1978 |
| JP | 57-194500 | 11/1982 |
| JP | 58-111295 | 7/1983 |
| JP | 60-193292 | 10/1985 |
| JP | 63-255783 | 10/1988 |
| JP | 01-159388 | 11/1989 |
| JP | 04-259789 | 9/1992 |
| JP | 04-299282 | 10/1992 |
| JP | 06-193884 | 7/1994 |
| JP | 06-215871 | 8/1994 |
| JP | 06-251866 | 9/1994 |
| JP | 06-310268 | 11/1994 |
| JP | 08-064359 | 3/1996 |
| JP | 09-229372 | 9/1997 |
| JP | 09-511355 | 11/1997 |
| JP | 10-196966 | 7/1998 |
| JP | 2000-357583 A | 12/2000 |
| JP | 2001-086967 A | 4/2001 |
| JP | 2001-317741 | 11/2001 |
| JP | 2002-037420 | 2/2002 |
| JP | 2002-243161 | 8/2002 |
| JP | 2002-280159 | 9/2002 |
| JP | 2002-532239 | 10/2002 |
| JP | 2004-171852 | 6/2004 |
| JP | 2005-228604 | 8/2005 |
| JP | 5179382 | 1/2013 |
| KR | 1020050058824 A | 6/2005 |
| WO | WO 91/07069 | 5/1991 |
| WO | WO 95/27387 | 10/1995 |
| WO | WO 95/27388 | 10/1995 |
| WO | WO 97/36728 | 10/1997 |
| WO | WO 99/13688 | 3/1999 |
| WO | WO 2000/036880 | 6/2000 |
| WO | WO 00/052970 | 9/2000 |
| WO | WO 2001/062379 A1 | 8/2001 |
| WO | WO 2002/023953 A1 | 3/2002 |
| WO | WO 2002/035886 A2 | 5/2002 |
| WO | WO 2003/056919 A2 | 7/2003 |
| WO | WO 2004/010740 A1 | 1/2004 |
| WO | WO 2004/054705 A1 | 7/2004 |
| WO | WO 2004/059563 | 7/2004 |
| WO | WO 2004/093499 A1 | 10/2004 |
| WO | WO 2005/027644 A2 | 3/2005 |
| WO | WO 2005/041672 A2 | 5/2005 |
| WO | WO 2005/073449 A1 | 8/2005 |
| WO | WO 2005/106333 A1 | 11/2005 |
| WO | WO 2006/016372 A1 | 2/2006 |
| WO | WO 2007/018565 A2 | 2/2007 |
| WO | WO 2007/095904 A1 | 8/2007 |
| WO | WO 2007/096877 A2 | 8/2007 |
| WO | WO 2007/096878 A2 | 8/2007 |
| WO | WO 2008/007368 A2 | 1/2008 |
| WO | WO 2008/048497 A2 | 4/2008 |
| WO | WO 2008/087618 A2 | 7/2008 |
| WO | WO 2008/102334 A1 | 8/2008 |
| WO | WO 2008/102360 | 8/2008 |
| WO | WO 2008/143942 A2 | 11/2008 |
| WO | WO 2008/145213 A1 | 12/2008 |
| WO | WO 2008/145214 A1 | 12/2008 |
| WO | WO 2008/145216 A1 | 12/2008 |
| WO | WO 2008/145217 A1 | 12/2008 |
| WO | WO 2009/080344 A2 | 7/2009 |
| WO | WO 2009/104191 A2 | 8/2009 |
| WO | WO 2010/052724 A2 | 5/2010 |
| WO | WO 2010/052725 A2 | 5/2010 |
| WO | WO 2010/147439 A2 | 12/2010 |

OTHER PUBLICATIONS

Communication of Notice of Opposition from the European Patent Office, Request to File Opposition Observations, Ref. P55775EP3, Application No. 15192062.6-1202, EP Patent No. 3010309, 1 page, dated Jan. 24, 2020.

Adams "Microwave Blood Plasma Defroster", Journal of Microwave Power and Electromagnetic Energy, 26(3): 156-159, 1991.

Arens et al. "Danger of Overwarming Blood by Microwave", JAMA, 218(7): 1045-1046, 718, Nov. 15, 1971.

Bird "Antenna Feeds", Encyclopedia of RF and Microwave Engineering, p. 185-217, 2005.

Bows, J.R., "Variable Frequency Microwave Heating of Food", Journal of Microwave Power and Electromagnetic Energy 34(4), 1999, pp. 227-238.

Boström et al. "Rapid Thawing of Fresh-Frozen Plasma With Radio Wave-Based Thawing Technology and Effects on Coagulation Factors During Prolonged Storage at 4° C.", Vox Sanguinis, 97: 34-38, 2009.

Collin "Electromagnetic Theory: Wave Equation", Foundations for Microwave Engineering, IEEE Press Series on Electromagnetic Wave Theory, 2nd Ed., Chap.2.4: 31-32, 2001.

Collin "Transmission Lines and Waveguides", Foundations for Microwave Engineering, IEEE Press Series on Electromagnetic Wave Theory, 2nd Ed., p. 96-99, 2001.

Collin, R.E., "Chapter 4: Circuit Theory for Waveguiding Systems," *Foundations of Microwave Engineering*. 2nd ed. IEEE Press Series on electromagnetic wave theory, pp. 233-254, 2001.

Communication Pursuant to Article 94(3) EPC dated Apr. 29, 2010 From the European Patent Office Re.: Application No. 07706172.9.

Communication pursuant to Article 94(3) EPC, dated Mar. 22, 2012 in related European Patent Application No. 07 706 172.9 (4 pages).

Communication Pursuant to Article 94(3) EPC, dated Mar. 26, 2012 Re: European Application No. 09 793 620.7-2214, 5 pages.

Communication Relating to the Results of the Partial International Search dated Oct. 24, 2007 From the International Searching Authority Re.: Application No. PCT/IL2007/000864.

Communication Relating to the Results of the Partial International Search dated Aug. 3, 2009 From the International Searching Authority Re.: Application No. PCT/IL2009/000199.

Communication Relating to the Results of the Partial International Search dated Aug. 4, 2008 From the International Searching Authority Re.: Application No. PCT/IL2008/000231.

Communication Relating to the Results of the Partial International Search dated Jul. 10, 2002 From the International Searching Authority Re.: Application No. PCT/IL2007/000235.

Communication Relating to the Results of the Partial International Search dated Jul. 10, 2007 From the International Searching Authority Re.: Application No. PCT/IL2007/000236.

Communication Relating to the Results of the Partial International Search dated Mar. 29, 2010 From the International Searching Authority Re.: Application No. PCT/IL2009/001058.

English Translation of Notice of Reason for Rejection dated Aug. 27, 2013 from Japanese Patent Office in related Japanese Patent Application No. 2012-179718, 7 pages.

English Translation of Notice of Reason for Rejection dated Oct. 1, 2013 from Japanese Patent Office in related Japanese Patent Application No. 2012-179719, 5 pages.

English Translation of Notice of Reason for Rejection, dated Feb. 24, 2012 Re: Japanese Patent Application No. 2008-555943, 5 pages.

European Search Report dated Jun. 10, 2013, in related European Patent Application No. EP 12165499.0 (6 pages).

European Search Report in a related European Application No. EP2528413 dated Apr. 7, 2014, 15 pages.

Evans "Electromagnetic Rewarming: The Effect of CPA Concentration and Radio Source Frequency on Uniformity and Efficiency of Heating", Cryobiology, 40: 126-138, 2000.

(56) References Cited

OTHER PUBLICATIONS

Evans et al. "Design of A Uhf Applicator for Rewarming of Cryopreserved Biomaterials", IEEE Transactions on Biomedical Engineering, 39(3): 217-225, Mar. 1992.
First Office Action dated Dec. 29, 2014, in related Chinese Application No. 201310126456.8, 8 pages.
Foster et al. "Biological Effects of Radiofrequency Energy as Related to Health and Safety", Encyclopedia of RF and Microwave Engineering, p. 511-523, 2005.
Foster et al. "Dielectric Properties of Tissues", Handbook of Biological Effects of Electromagnetic Fields, CRC Press, 2nd Ed., p. 25-63, 1996.
Geedipalli et al. "Heat Transfer in A Combination Microwave-Jet Impingement Oven", Food and Bioproducts Processing, 86: 53-63, 2008.
Hambling "Forget Lasers, Phasers and Other Beam Weapons—Radiofrequency Devices Are Here, and They're Set to 'Sting'", Tech Watch: Forecasting Pain, 183(12): 32, Dec. 2006.
Herring et al. "OSU Tunes Into A Cooking Innovation", OSU News & Communication Services, Oregon State University, 2 P., Apr. 30, 2004.
Hirsch et al. "Indicators of Erythrocyte Damage After Microwave Warming of Packed Red Blood Cells", Clinical Chemistry, 49(5): 792-799, 2003.
Hirsch et al. "Temperature Course and Distribution During Plasma Heating With A Microwave Device", Anaesthesia, 58: 444-447, 2003.
International Preliminary Report on Patentability and Written Opinion dated Aug. 26, 2008 From the International Preliminary Examining Authority Re.: Application No. PCT/IL2007/000235.
International Preliminary Report on Patentability and Written Opinion dated Aug. 26, 2009 From the International Preliminary Examining Authority Re.: Application No. PCT/IL2008/000231.
International Preliminary Report on Patentability dated Jan. 13, 2009 From the International Bureau of WIPO Re.: Application No. PCT/IL2007/000864.
International Preliminary Report on Patentability dated Aug. 26, 2008 From the International Bureau of WIPO Re.: Application No. PCT/IL2007/000235.
International Preliminary Report on Patentability dated Aug. 26, 2009 From the International Bureau of WIPO Re.: Application No. PCT/IL2007/001073.
International Preliminary Report on Patentability dated May 29, 2008 From the International Preliminary Examining Authority Re.: Application No. PCT/IL2007/000236.
International Search Report and the Written Opinion dated Nov. 13, 2008 From the International Searching Authority Re.: Application No. PCT/IL2008/000231.
International Search Report and the Written Opinion dated Jun. 15, 2010 From the International Searching Authority Re.: Application No. PCT/IL2009/001058.
International Search Report and the Written Opinion dated May 20, 2008 From the International Searching Authority by the Patent Cooperation Treaty Re.: Application No. PCT/IL2007/001073.
International Search Report and the Written Opinion dated Jun. 24, 2010 From the International Searching Authority Re.: Application No. PCT/IL2009/001059.
International Search Report and the Written Opinion dated Nov. 25, 2009 From the International Searching Authority Re.: Application No. PCT/IL2009/000199.
International Search Report and the Written Opinion dated Dec. 27, 2007 From the International Searching Authority Re.: Application No. PCT/IL2007/000864.
International Search Report and the Written Opinion dated Aug. 31, 2007 From the International Searching Authority by the Patent Cooperation Treaty Re.: Application No. PCT/IL20007/000236.
International Search Report and Written Opinion regarding International Application No. PCT/IL10/100380, dated Aug. 30, 2010,12 pages.
International Search Report and Written Opinion regarding International Application No. PCT/IL10/100381, dated Sep. 1, 2010,124 pages.
International Search Report dated Mar. 3, 2010 From the International Searching Authority Re.: Application No. PCT/IL2009/001057.
International Search Report dated Sep. 11, 2007 From the International Searching Authority by the Patent Cooperation Treaty Re.: Application No. PCT/IL2007/000235.
Invitation Pursuant to Rule 63(1) EPC dated Dec. 18, 2012, in related European Patent Application No. 12165473.5 (5 pages).
Invitation Pursuant to Rule 63(1) EPC dated Jan. 28, 2013, in related European Patent Application No. 12165499.0 (5 pages).
Khummongkol et al. "Heat Transfer Between Impinging Air and Impinged Surface: A Factorial Design", The Joint International Conference on 'Sustainable Energy and Environment (SEE)', Hua Hin, Thailand, Dec. 1-3, 2004, 4-003(0): 431-436, 2004.
Kim, J. et al., "Novel Microstrip-to-Stripline Transitions for Leakage Suppression in Multilayer Microwave Circuits," Proceedings of IEEE 7th topical Meeting on Electrical Performance of Electronic Packaging, pp. 252-255, Oct. 1998.
Kusama, Y. et al., "A Study on the Door Seal Structure of a Microwave Oven Using the Finite-Difference Time-Domain Method," *Microwave and Optical Technology Letters*, vol. 19, No. 5, Dec. 5, 1998.
Kusama, Y. et al., "Analysis of Door Seal Structure of Microwave Oven with Consideration of Higher Modes by the FDTD Method," *Electronics and Communications in Japan*, Part 2, vol. 85, No. 3, 2002.
Kusama, Y. et al., "Size Reduction of the Door Seal Structure of a Microwave Oven by the FDTD Method," *Electronics and Communications in Japan*, Part 2, vol. 86, No. 10, 2003.
Lapin N9GL's RF Safety Column: The Military's New RF Weapon, ARRL Handbook for Radio Amateurs, American Radio Relay League, 3 P., 2001.
Lee, G. et al., "Suppression of the CPW Leakage in Common Millimeter-Wave Flip-Chip Structures," *IEEE Microwave and Guided Wave Letters*, vol. 8, No. 11, Nov. 11, 1998.
Letter from Opponent dated Dec. 5, 2018, Ref. P55775EP1 in corresponding European Application/Patent No. 12165473.5-1204 / 2528413, issued by the European Opposition Board (11 pages).
Liang et al. "Multiband Characteristics of Two Fractal Antennas", Microwave and Optical Technology Letters, 23(4): 242-245, Nov. 20, 1999.
Mackay et al., "Frequency Agile Sources for Microwave Ovens", Journal of Microwave Power 14(1 ), 1979, pp. 1-14.
Marcroft et al. "Flow Field in A Hot Air Jet Impingement Oven—Part I: A Single Impinging Jet", Journal of Food Processing Preservation, 23: 217-233, 1999.
Marcroft et al. "Flow Field in A Hot Air Jet Impingement Oven—Part II: Multiple Impingement Jets", Journal of Food Processing Preservation, 23: 235-248, 1999.
Matsumoto, K. et al., "An Analysis of a Door Seal Structure of a Microwave Oven with an Inserted Sheet-Type Lossy Material Using FDTD Method," *Electronics and Communications in Japan*, Part 1, vol. 85, No. 9, 2002.
Matsumoto, K. et al., "An efficient Analysis on Door structure of Microwave Oven Using Combined waves of High Order Modes," *33rd European Microwave Conference*, Munich, 2003.
Mett, R. R. et al., "Microwave leakage from field modulation slots in TE011 electron paramagnetic resonance cavities," *Review of Scientific Instruments* 76, 014702, 2005.
Minutes of the Oral Proceedings held on Jan. 18, 2013 and Annex, in related European Patent Application No. 07 706 172.9, (22 pages).
Notice of Allowance issued by the United States Patent and Trademark Office in U.S. Appl. No. 13/464,754 dated Apr. 28, 2014, 21 pages.
Notice of Opposition against EP 2508414 dated Feb. 10, 2017, *Whirlpool EMEA S.p.A.* v. *Goji Limited*, 21 pages.
Notice of Allowance issued by the United States Patent and Trademark Office in U.S. Appl. No. 12/563,182 dated Jul. 17, 2014, 8 pages.

(56) References Cited

OTHER PUBLICATIONS

Notice of Opposition against EP 2508414 dated Feb. 13, 2017, *Stefan Haas.* v. *Goji Limited*, 25 pages.
Notice of Allowance issued by the United States Patent and Trademark Office in U.S. Appl. No. 12/907,663 dated Aug. 19, 2014, 16 pages.
Notice of Allowance issued by the United States Patent and Trademark Office in U.S. Appl. No. 12/899,348, dated Sep. 3, 2014, 15 pages.
Notice of Defects issued from the Israeli Patent Office in corresponding Israeli Patent Application No. 193581, dated Sep. 26, 2011, total 5 pgs (including translation).
Notice of Reason for Rejection issued by the Japanese Patent Office in Japanese Application No. 2012-179718 dated Mar. 14, 2014, 7 pages.
Notice of the Reasons for Rejection dated Nov. 13, 2012, in related Korean Patent Application No. 2008-7022187 (6 pages).
Office Action dated Feb. 23, 2015 in related European Application No. 12165473.5, 4 pages.
Office Action issued by the United States Patent and Trademark Office in U.S. Appl. No. 12/563,182 dated Feb. 26, 2014,15 pages.
Office Action issued by the United States Patent and Trademark Office in U.S. Appl. No. 12/899,348 dated Jan. 3, 2014, 31 pages.
Office Action issued by the United States Patent and Trademark Office in U.S. Appl. No. 12/907,663 dated Apr. 15, 2014, 27 pages.
Office Action issued by the United States Patent and Trademark Office in U.S. Appl. No. 12/899,348 dated Jun. 27, 2014,10 pages.
Office Action issued by the United States Patent and Trademark Office in U.S. Appl. No. 12/563,180 dated Aug. 28, 2013, 23 pages.
Office Action issued by the United States Patent and Trademark Office in U.S. Appl. No. 12/899,348, dated Jul. 10, 2013 (18 pages).
Office Action issued by the United States Patent and Trademark Office in U.S. Appl. No. 12/563,182, dated Jul. 5, 2013 (20 pages).
Office Action issued by the United States Patent and Trademark Office in U.S. Appl. No. 12/907,663, dated Jun. 6, 2013 (20 pages).
Office Action issued by the United States Patent and Trademark Office in U.S. Appl. No. 12/563,182, dated Oct. 4, 2012 (38 pages).
Office Action issued by the United States Patent and Trademark Office in U.S. Appl. No. 13/464,754, dated Jun. 6, 2013 (12 pages).
Office Action issued by the United States Patent and Trademark Office in U.S. Appl. No. 12/309,173 dated Aug. 13, 2012, 12 pages.
Office Action issued by the United States Patent and Trademark Office in U.S. Appl. No. 12/899,348 dated Nov. 10, 2011, 13 pages.
Office Action issued by the United States Patent and Trademark Office in U.S. Appl. No. 12/899,348 dated Jul. 31, 2012,11 pages.
Office Action issued by the United States Patent and Trademark Office in U.S. Appl. No. 12/899,348 dated Sep. 21, 2012, 14 pages.
Office Action issued by the United States Patent and Trademark Office in U.S. Appl. No. 12/563,182 dated Oct. 4, 2012, 15 pages.
Office Action issued by the United States Patent and Trademark Office in U.S. Appl. No. 12/907,663 dated Nov. 22, 2011 (9 pages).
Office Action issued by the United States Patent and Trademark Office in U.S. Appl. No. 12/907,663 dated Aug. 29, 2012 (26 pages).
Office Action issued by the United States Patent and Trademark Office in U.S. Appl. No. 12/457,154 dated Sep. 12, 2012, 9 pages.
Office Action issued by the United States Patent and Trademark Office in U.S. Appl. No. 12/906,604 dated Jun. 25, 2012, 7 pages.
Office Action issued by the United States Patent and Trademark Office in U.S. Appl. No. 12/906,604 dated Nov. 15, 2012, 7 pages.
Office Action issued in Israeli Application No. 228423 dated Jul. 23, 2014 4 pages.
Official Action dated Jun. 3, 2010 From the Re.: U.S. Appl. No. 12/217,167.
Official Action dated Nov. 10, 2011 From the Re.: U.S. Appl. No. 12/899,348.
Official Action dated Jul. 14, 2010 From the State IP Office, P.R. China Re.: Application No. 200780014028.9.
Official Action dated Nov. 22, 2011 From the Re.: U.S. Appl. No. 12/907,663.
Official Action dated Jun. 28, 2011 From the Re.: U.S. Appl. No. 12/222,948.
Official Office Action dated May 27, 2013 from Taiwan Patent Office in related Taiwanese Patent Application No. 96106448, 10 pages.
Penfold et al. "Control of Thermal Runaway and Uniformity of Heating in the Electromagnetic Rewarming of A Cryopreserved Kidney Phantom", Cryobiology, 30: 493-508, 1993.
Pozar, D.M., "Chapter 4: Microwave Network analysis," *Microwave Engineering*, 2nd ed., John Wiley & Sons, Inc., pp. 190-211, 1998.
Provisional Non-Binding Opinion (PNBO), dated Jan. 2, 2018 (date stamped Jan. 8, 2018), in corresponding European Application/Patent No. 12165473.5-1808 / 2528413, issued by the European Opposition Board (11 pages).
Rabinovitch, J., "New Design for the MKI RF Finger Contacts in the LHC," 2007.
Repacholi "Radiofrequency Electromagnetic Field Exposure Standards", IEEE Engineering in Medicine and Biology Magazine, 6: 18-21, Mar. 1987.
Response dated Feb. 23, 2010 to the Written Opinion dated Nov. 25, 2009 From the International Searching Authority Re.: Application No. PCT/IL2009/000199.
Response to the Written Opinion, dated Feb. 23, 2010, for International Application No. PCT/IL2009/000199, from the International Searching Authority.
Risco "Microwaves and Vascular Perfusion: Obtaining Very Rapid Organ Cooling", Cryobiology, 49: 294, Abstract No. 11, 2004.
Robinson et al. "Electromagnetic Re-Warming of Cryopreserved Tissues: Effect of Choice of Cryoprotectant and Sample Shape on Uniformity of Heating", Physics in Medicine and Biology, 47: 2311-2325, 2002.
Robinson et al. "Rapid Electromagnetic Warming of Cells and Tissues", IEEE Transactions on Biomedical Engineering, 46(12): 1413-1425, Dec. 1999.
Rocha, A. M. et al., "Optimization of a door seal structure of a microwave oven using a FDTD method," *International Journal of Numerical Modeling: Electronic Networks, Devices and Fields*, Int. J. Numer. Model. 2008; 21:507-513, Jul. 21, 2008.
Second Office Action dated Aug. 24, 2015, in related Chinese Application No. 201310126456.8, 7 pages.
Schwan et al. "RF-Field Interactions With Biological Systems: Electrical Properties and Biophysical Mechanisms", Proceedings of the IEEE, 68(1): 104-113, Jan. 1980.
Scott "Understanding Microwaves", A Wiley-Interscience Publication, John Wiley and Sons, p. 327-331, 1993.
Search Report dated May 9, 2013 in related Taiwanese Patent Application No. 096106448, 1 page.
Second Office Action dated Jan. 5, 2012 from the Chinese State Intellectual Property Office in related Chinese Application No. 200780014028.9 (3 pages).
Shelley "Inside View on Deep Heat", Eureka Innovative Engineering Design, 2 P., May 14, 2007.
Sherman et al. "A New Rapid Method for Thawing Fresh Frozen Plasma", Transfusion, 14(6): 595-597, Nov.-Dec. 1974.
Söhngen et al. "Thawing of Fresh-Frozen Plasma With A New Microwave Oven", Transfusion, 28(6): 576-580, 1988.
Summons to attend oral proceedings pursuant to Rule 115(1) EPC issued by the European Patent Office in EP 07706172.9, dated Sep. 19, 2012, 6 pages.
Submission of Response by Stefan Haas dated Jan. 4, 2019, Ref. P55775EP2 in corresponding European Application No./Patent No. 12165499.0-1204 / 2528414 (11 pages).
Swain et al., "What is the most energy efficient method of cooking a 'British' roast dinner?," *University of Bristol Fryers Research Project*, Feb. 29, 2008.
Submission of Response by Whirlpool EMEA S.p.A. dated Jan. 8, 2019, Ref. P55775EP2 in corresponding European Application No./Patent No. 12165499.0-1204 / 2528414 (16 pages).
Third Office Action dated Aug. 8, 2012 from the Chinese State Intellectual Property Office in related Chinese Application No. 200780014028.9 (3 pages).

(56) References Cited

OTHER PUBLICATIONS

Tomiyasu, K., "Minimizing Radiation Leakage from Microwave Ovens," *IEEE Microwave Magazine*, Feb. 1, 2008.

Umashankar, K. et al., "A Novel Method to Analyze Electromagnetic Scattering of Complex Objects," *IEEE Transactions on Electromagnetic Compatibility*, vol. EMC-24, No. 4, Nov. 1, 1982.

Umishita, K. et al., "Absorption and Shielding Effect of Electromagnetic Wave at GHz Frequency by Multiwalled Carbon Nanotube-Polymer Composites," *Proceedings of the 9th European Conference on Wireless Technology*, Sep. 1, 2006.

Von Hippel "Theory: Macroscopic Properties of Dielectrics", Dielectric Materials and Applications, Artech House, p. 3-5, 1954.

Walker et al. "Fractal Volume Antennas", Electronics Letters, 34(16): 1536-1537, Aug. 6, 1998.

Wusteman et al. "Vitrification of Large Tissues With Dielectric Warming: Biological Problems and Some Approaches to Their Solution", Cryobiology, 48: 179-189, 2004.

U.S. Appl. No. 60/775,231, filed Feb. 21, 2006 for Ben-Shmuel et al.

U.S. Appl. No. 60/806,860, filed Jul. 10, 2006 for Ben-Shmuel et al.

Communication from EPO enclosing Stefan Haas (Opponent) written submissions related to the opposition process in Ref. P55775EP3-OP, Application No. 15192062.6-1210, EP Patent No. 3010309, 10 pages, dated Jan. 28, 2021.

Summons to Attend Oral Proceedings from the European Patent Office, Ref. P55775EP3-OP, Application No. 15192062.6 - 1210, EP Patent No. 3010309, 28 pages, dated Jul. 31, 2020.

ELECTROMAGNETIC HEATING

RELATED APPLICATIONS

The present application is a continuation of U.S. patent application Ser. No. 12/563,180, filed Sep. 21, 2009, which is a continuation of U.S. patent application Ser. No. 12/222,948, filed on Aug. 20, 2008 (now U.S. Pat. No. 8,207,479), which is a continuation application of PCT Patent Application No. PCT/IL2007/000236, filed on Feb. 21, 2007, which claims priority of U.S. Provisional Patent Application No. 60/775,231, filed on Feb. 21, 2006 and U.S. Provisional Patent Application No. 60/806,860, filed on Jul. 10, 2006. The contents of the above-referenced applications are incorporated herein by reference.

FIELD OF THE INVENTION

The present invention is concerned generally with heating of materials with electromagnetic energy.

BACKGROUND OF THE INVENTION

The microwave oven is a ubiquitous feature in modern society. However, its limitations are well known. These include, for example uneven heating and slow absorption of heat. In fact, ordinary microwave ovens, when used for heating (e.g. defrosting), cause temperature differences as high as 100° C. between different locations in the heated object, resulting in creation of hotspots, regions of thermal runaway. Fore example, frozen foods that are thawed in a microwave oven may have one or more part (e.g. the outside) that is warm or even partly cooked before or other parts (e.g. in the interior) are even defrosted. Also known are hotspots that occur within a heated cup of liquid that may result in personal injury to a user. One common method that attempts to reduce hot-spots is to rotate the article being heated. This method does not provide uniform heating as would be desired.

One method of providing uniform heating is to allow the heat deposited in a hot spot to diffuse to surrounding regions and heat them by conduction. Such methods may include an intermittent heating procedure in which the heating is periodically stopped to allow diffusion of heat. While this method may be used in conjunction with the methods of the present invention, by itself the stop and go method of heating is either extremely slow (due to the low heat conductivity of most foods, which require long stop periods to make the method effective) or are relatively ineffective. Another method is to heat at a very low power. This can be used, for example, with large frozen bodies. If the heating is slow enough, then the excess heat at hot spots diffuses before the temperature rise at the hot spot becomes objectionable. However, this method requires up to 10 or 20 times as much time for heating to be fully effective. Due to convection from the object, it is not a serious option for cooking or heating much above room temperature.

A number of papers have been published in which a theoretical analysis of the problem of microwave warming of a cryogenic sample has been carried out. Because of the difficulties of such analysis, such analysis has only been carried out on regular shapes, such as spherical and ellipsoidal shapes. Experimental attempts have apparently been made on kidney sized specimens, but results of these experiments do not indicate that a viable solution for defrosting kidneys is available.

Moreover, there does not appear to be a solution for defrosting other organs, or for defrosting warming or cooking foods, of more arbitrary shapes.

Prior art publications include:
S. Evans, Electromagnetic Rewarming: The effect of CPA concentration and radio source frequency on uniformity and efficiency of heating, Cryobiology 40 (2000) 126-138
S. Evans, et al., Design of a UHF applicator for rewarming of cryopreserved biomaterials, IEEE Trans. Biomed. Eng. 39 (1992) 217-225
M. P. Robinson, et al., Rapid electromagnetic warming of cells and tissues, IEEE Trans. Biomed. Eng. 46 (1999) 1413-1425
M. P. Robinson, et al., Electromagnetic re-warming of cryopreserved tissues: effect of choice of cryoprotectant and sample shape on uniformity of heating, Phys. Med. Biol. 47 (2002) 2311— 2325.
M. C. Wusteman, Martin et al., Vitrification of large tissues with dielectric warming: biological problems and some approaches to their solution, Cryobiology 48 (2004) 179-189.

A paper entitled "Control of Thermal Runaway and Uniformity of Heating in the Electromagnetic Warming of a Cryopreserved Kidney Phantom" by J. D. J. Penfold, et al., in Cryobiology 30, 493-508 (1993) describes a theoretical analysis and experimental results. While some experiments were apparently made with a kidney sized phantom, the main reported results are with a uniform spherical object.

As reported a cavity was fed with electromagnetic energy at 434 MHz from three orthogonal directions (x, y, z). The x and y feeds were provided from a same generator and a phase change was introduced so that the field was circularly polarized. The frequency was varied in steps of 32 kHz (apparently up to about 350 kHz maximum) to match the input impedance as it changed with increasing temperature.

All of the above articles are incorporated herein by reference.

SUMMARY OF THE INVENTION

The present inventors have realized that the measures taken by prior art investigators to provide uniform heating were inadequate and could not, by themselves, lead to a viable methodology for uniform heating (or defrosting) of irregular shaped objects such as organs, foods or the like. In particular it was discovered that the prior art suffered from many problems. As used herein, the term irregular means objects that depart from spherical or ellipsoid shape by more than 5% RMS volume.

Conventional microwave ovens are configured to feed into the oven chamber microwave energy that is essentially of a single frequency. Due to device constraints the energy is fed at different frequencies in a small range, normally between 2.4 and 2.5 MHz. The inventors realized that the constraints of using a substantially constant frequency, or even tracking a single dissipation peak in a small frequency range, significantly limited the ability to achieve uniform heating. In fact, heating at a single frequency is found to be one of the main reasons of hotspots. However, using different frequencies (using one or more feeds), may improve the uniformity of heating.

While some proposed prior art heaters did utilize more than one microwave input, the frequency differences between the two inputs are small, less than 6 MHz.

The inventors also found that the structure of the cavity of a conventional microwave oven, and especially the mode structure of the cavity, inherently did not allow achievement of uniform heating. In general, the fields for a given mode in a cavity vary with position and the heating varies with the strength of the fields.

In the art, attempts were made to set the parameters of the microwave oven to match features of a heated object before heating begins. However, during heating features of a heated object (e.g. the tendency to absorb energy of a given frequency) change. Hence the inventors realized that even if a heater was tuned to a heated object before operation, after even a short period of operation the features of the object will have changed and the tuning will no longer be significant.

Another problem is that at times, the absorption at a given location of an object is higher as the temperature increases. This can give rise to a "thermal runaway" problem (even in conventional microwave oven), wherein a relatively hot place absorbs more than a colder one thus continuously increasing the temperature difference. When an effort is made to tune the energy input of the device to the object's impedance, the efficiency of energy delivery into the object may be maximized, but hotspots are also generally increased.

The inventors also noted that known publications dealing with dissipation of energy deal with absorption of energy by the resonator (e.g. surface currents) and not necessarily the object. Furthermore, no attention was drawn to the distribution of dissipation of energy in the object (with the exception of some discussion of penetration depth).

Furthermore, when feeding from multiple directions into a cavity, coupling between the feeds can be a major problem. While for spherical samples these effects are minimal, for even moderate variations from this shape, the coupling between inputs can be quite large. Such coupling caused a number of problems including uneven heating and low power efficiency.

Some exemplary embodiments of the invention deal with one or more of these problems.

As used herein the term "heating" means delivering electromagnetic (EM) energy into an object. At times, an object may be heated according to the present invention without temperature increase (e.g. when it is concomitantly cooled at a rate that is at least equal to the heating rate or at a phase change where the transmitted energy is taken up for the phase change). Heating includes: thawing, defrosting, heating, cooking, drying etc, utilizing electromagnetic energy.

An aspect of some embodiments of the invention deals with more uniform heating of a real life, i.e., non-uniform or irregular geometry object. As used herein the term "object" means any object, including a composition of one or more objects. In an embodiment of the invention, the hottest part of a thawed organ is 6° C. or less, when the coldest part reaches 0° C. This has been confirmed with a cow liver. In experiments with a cow liver, after thawing from −50° C., the range of temperatures in the thawed liver ranged from 8° C. to 10° C. In general, it is desirable to thaw the object such that all parts are above freezing point, to avoid recrystallization. In another embodiment objects are heated to other temperatures (e.g. serving or cooking temperatures, or a subzero temperature being above the temperature of the object before heating), while preserving a post heating uniformity of temperature within 50° C. At times, the uniformity of temperature in a heated (or thawed) object is maintained during heating such that at all times the uniformity of temperature is within 50° C. or even within 10° C. or 5° C.

An aspect of some embodiments of the invention is concerned with sweeping the frequency of the feed (or feeds) over a finite set of frequency sub-bands (i.e. feeding energy into the heater over many frequencies belonging to each sub-band). For example, the dissipation of energy is measured for a band of RF frequencies (e.g. the whole operation range of the heater), and based on the measured results, a finite set of frequency sub-bands is selected. The width of band over which the energy efficiency is measured may for example be up to 2 GHz. At times, the band may have a width between 0.5% (5/1000 [MHz]) and 25% (100/400 [MHz]) of the center frequency.

The measurement may be performed before heating an object, at one or more times during heating the object, or in advance (with a sample object to define the sub-bands for additional essentially identical objects). In an embodiment of the invention, RF energy is fed to the cavity at a plurality of frequencies and power levels responsive to the energy efficiency measurements. For example, the input may be frequency swept. Other methods described below may also be used.

An aspect of some embodiments of the present invention is concerned with assuring the efficiency of the heating process. The heating efficiency is defined as portion of the power generated by an RF energy source (amplifier or other) that is absorbed in a heated object. Higher efficiency of the heating process results in a higher efficiency of the whole process.

In an embodiment of the invention, the power coupled to other feeds at each frequency in certain band ($S_{ij}$) and the return loss at each frequency ($S_{ii}$) are taken into account in determining the heating efficiency and in adjusting certain characteristics of the apparatus, for example, a decision what power at what frequencies to transmit and the timing of transmitting those frequencies at matching powers. Optionally, the absorbed power (input power less coupled power) fed into the system from one feed is adjusted to be the same as the absorbed power fed into each of the other feeds.

In an embodiment of the invention, the width of the efficiency "spectrum" (related to the Q factor) is desirably increased. It is known, from the general theory of RF, that bigger loss in the object (or load) matches lower Q factor. In addition, wide dissipation peak allows for sweeping the frequency about the peak of efficiency, a technique that is believed to further improve the uniformity of heating. Based on the band width, coupling between antennas and surface currents may be reduced. If dissipation is measured (even in an empty chamber) the dissipation peaks caused by antennas and/or metal components, and/or surface currents appear as narrow dissipation peaks. Thus, by avoiding transmittal in such bands (e.g. width being below 0.25% or even below 0.75%) the energy loss may be reduced. Such measurement may be carried out before and/or during heating of an object or during manufacture of a heater to prevent transmission of such wavelengths. Furthermore, coupling between inputs can be measured during manufacture and bands with high coupling avoided.

In some embodiments of the invention, the power input to the feeds at each transmitted frequency is adjusted to take into account differences in power absorbed by the object being heated, which may serve to provide a uniform or more uniform power absorption. Applicants have found that changing the transmitted frequency in some chosen sub-bands and the input power at each frequency, within a those chosen sub-bands, optionally about the absorption peaks, results in a change in the heating pattern within the heated object. Thus, by sweeping the frequency in chosen sub-bands, while the powers are properly adjusted, various portions of the object are heated. Keeping the total energy absorbed in different locations of an object uniform results in more even heating of the object.

An aspect of some embodiments of the invention is concerned with the design, construction and calibration of a cavity for RF heating. The cavity may be designed in order to meet certain needs of the present invention.

In an embodiment of the invention, the RF heater comprises one, two or more electromagnetic energy feeds that feed energy to the cavity. Optionally, the feeds are antennas, preferably, wideband and/or directional antennae. Optionally the feeds are polarized in different directions to reduce coupling. These characteristics may be used to lower the coupling and provide a higher degree of freedom in working the invention. In an exemplary embodiment of the invention three feeds which are placed parallel to orthogonal coordinates are used. Optionally two or more than three, for example six feeds are used. Optionally, only two (or in some embodiments even one) feeds are provided, when a lesser uniformity is acceptable and utilizing other aspects of the invention provides sufficient uniformity.

In some embodiments, rather than using an antenna having a single main wire, through which the incoming wave reaches all parts of the antenna structure (which can be an array of antennas) several antennas may be used. This group of antennas may be operated as an antenna array by delivering energy to each of the six antennas at a different time, thus matching the phase resulting from the geometrical design of the complex antenna. This allows summing the RF energy on the object versus summing it before the antenna. Among the benefits of such groups of antennas is the potential reduction of production costs (cheaper amplifiers). In addition, a possibility to control the phases of each input dynamically (and independently) provides an additional degree of freedom in controlling the RF (EM) modes.

Furthermore, it is noted that an antenna array would normally have a bigger area than a single antenna. A possible advantage would be reducing the dependence of location of a heated object on the heating protocol. Possibly two or more of the antenna sources are coherent, making the antenna structures have a common behavior. Furthermore, an antenna array may have a higher directionality or bandwidth and may thus provide advantages in working the invention. Furthermore, arrays can often be made steerable, to provide variable directionality of the antenna and to allow better transfer of energy to the object being heated.

In some embodiments of the invention, a wide band solid state amplifier may be used as an RF energy source. Among the potential benefits is the wide band of frequencies that may be introduced by the solid state amplifier.

In an embodiment of the invention, at least one field adjusting element is placed in the cavity to improve one or more parameters of the heating process (e.g., coupling). Optionally more than one field adjusting element is used. Optionally, any of the boundaries of at least one of the field adjusting elements is electrically floating (not touching the metal walls of the cavity). Optionally any part of the boundaries of at least one element is attached to one of the walls of the cavity. In an exemplary embodiment of the invention, at least one of the elements is not fixed in place, so that it can be moved and/or rotated and/or folded/unfolded to improve one or more parameters of the heating process. In an exemplary embodiment, of the invention, at least one of the elements rotates about an axis. In an exemplary embodiment of the invention, the at least one element slides along a wall of the cavity.

In an exemplary embodiment of the invention the field adjusting element is a metal or other conductor. Alternatively, any material, such as a dielectric, optionally loaded with metal, which is known to perturb electromagnetic fields, can be used as a matching element. The size, structure, place and material of a field adjusting element may affect the effectiveness of the field adjusting element. The effect of the size is dependent also on the location of the element. At one location the effect of the element on the measured energy transfer and other heating parameters and in another it is not. In general, when the element is in the direction of the directivity of the antenna it has a relatively large effect.

Additionally, the relation of height to radius of a chamber, and the geometric design (e.g. box shape vs. cylinder shape) are known affect the dissipation pattern of the chamber and the modes within the chamber. In designing a device according to some embodiments of the present invention, a simulation or trial error measurement of dissipation may be used to select a chamber being better suited, e.g. having wider dissipation peaks (low Q factor) in the object, or more adaptable (i.e. enabling a more dramatic change of the dissipation pattern, using similar field adjusting elements, for example as detailed below) for the desired heating.

An aspect of some embodiments of the invention is concerned with feeds used for feeding a cavity. According to an embodiment of the invention, energy is fed into the cavity via a coaxial input and the center conductor of the coaxial input is extended past the wall of the cavity to form a partial loop. In an exemplary embodiment of the invention, the end of the extension is not attached to the wall of the cavity. Optionally, the partial loop comprises an antenna that radiates toward the position of the object being heated to improve power transfer to the object.

According to another embodiment of the invention, the energy is fed into the cavity via a helical antenna optionally fed via a coaxial input. Optionally, the helix period, its diameter and/or its orientation are adjustable, thereby changing the modes and dissipation within the chamber. In some embodiments of the invention, one or more of the inputs utilize a right hand rotating helix while others utilize a left hand rotating helix. This may minimize coupling between the helices. Alternatively, all helices have the same orientation.

According to yet another embodiment of the invention, fractal antennas are used at one or more of the inputs.

According to some additional embodiments of the invention, different antenna types are used at different input ports.

In accordance with some embodiments of the invention antennas are designed according to a wavelength correction factor that converts the free space center wavelength of an antenna to the effective center frequency in the cavity. The inventors have found that this conversion is substantially independent of the shape or size of the object being heated.

An aspect of some embodiments of the invention relates to a method of controlling the input of electromagnetic energy to a cavity of a heater.

In an exemplary embodiment of the invention one or more characteristics of the heater are adjusted during heating of an object, responsive to changes in the object or during initial adjustment of the heater. In an exemplary embodiment at least one of the (i) position and/or orientation of at least one field adjusting element and/or (ii) at the power of transmission in at least one frequency (or sub-band of frequencies) and/or (iii) characteristics of one antenna structure or more and/or (iv) the location of the heated object are adjusted to improve the net power and/or efficiency and/or uniformity of energy transfer to the object being heated. Optionally, two or more of input frequency, position and/or orientation of at least one field adjusting element are adjusted.

In an exemplary embodiment of the invention, the frequencies of the inputs are substantially different. While in the prior art cited above, the frequencies are allowed to differ by up to 6 MHz, in the exemplary embodiment of the present invention, the frequencies may differ by 10, 20, 50, 100 or even several hundreds of MHz. This allows for greater flexibility in providing power evenly to the object. In prior art, by immersing the object in an anti-freezing liquid, uniformity of the object was achieved. This resulted in a system in which the characteristics of the liquid were dominant, the frequency changed little during heating, but the object itself was not well matched to the microwave environment. Moreover, at times it is preferred not to subject the object to uniformity induction (e.g. exposure to a fluid that might be hazardous to biological material or consumption or damage the taste or structure of food).

Optionally, the chamber environment is controlled using conventional environmental control elements (such as introduction of humidity, cooling or warming), is provided to the outside of the object. Such external cooling may allow avoiding overheating of the outside. Alternatively, some heating may be provided to the outside to start the defrosting process. This may help prevent recrystallization, or in the case of an egg being boiled, the heating would reduce the temperature gradient (and therefore stress) across the egg shell, thus reducing the chances of cracking and bursting. Accordingly, in some embodiments of the invention, heat radiating, concentrating or reflecting elements are provided on the outside or within the object being heated. Control of the humidity can provide moisture to the object being heated to avoid drying out of the object. For some objects, such as meat, it can cause a moisture retaining layer to be formed on the object, to avoid drying out of the object.

In some embodiments of the invention, RF sensitive objects are placed on or near the object being heated. Such object may act as passive sources. Examples of such sources include a rod of metal, which acts as a dipole radiator or a metal powder which may be used as a reflector or a piece of foil which may shield a small portion of the object being heated.

In an aspect of some embodiments of the invention, the end of heating (e.g. the end of defrost or boiling) is automatically detected and the heating stopped. Alternatively, during heating, the characteristics of the heating process may be adjusted to take the dielectric properties into account (e.g., more power is transmitted at the phase change to avoid spending a long time in this process). In an embodiment of the invention, the phase change is sensed by a change in dielectric properties of the object; for example, as they are represented by various measurements of return loss and coupling of the feeds or a desired operating frequency. Optionally, the object may be encased in a bag which will comprise temperature sensors. Optionally, a thermocouple, IR sensor and/or optical sensor are used to determine end of defrost, cooking or other heating processes.

Optionally, during heating, current temperature of an object is determined, based on the amount of RF power needed for a certain kind of an object and an exact measurement of the RF power absorbed in the object, through the continuous knowledge of the efficiency of power transfer and the power into the feeds of the cavity.

An aspect of some embodiments of the invention relates to providing a microwavable package, wrapper, tag, attachment or other indicator including heating instructions which indicate a desired driving profile for RF signals, rather than mere power as a function of time. In an exemplary embodiment of the invention, the indicated profile comprises an index to a table or a simulation which generates RF driving profiles including multiple frequencies. Optionally, at least 3, at least 5 or more distinct frequencies and/or one or more ranges of frequencies are indicated. Optionally, the driving profiles include one or more of number of inputs to use, phase of the input(s), temporal schedule and/or package relative information, such as package thermal and RF behavior.

In an exemplary embodiment of the invention, resonant circuits are embedded in the object and/or on its surface (as for example in a bag in which the object is packaged). Such sensors may be identified by performing a frequency scan and looking for a change in input impedance at the resonant frequency. Such circuits can be used to identify the object.

If the bag is provided with temperature sensitive elements, then they can also be used to determine temperature (and detect the end and/or progress of the heating process). Optionally, the frequency of these circuits is far from frequencies generally used for heating. Alternatively, the heater is configured so as not to transmit power in the frequency that interacts with the specific resonance structure (while potentially transmitting higher and lower frequencies).

There is thus provided, in accordance with an embodiment of the invention, an electromagnetic heater for heating an irregularly shaped object, comprising:

a cavity within which an object is to be placed;

at least one feed which feeds UHF or microwave energy into the cavity; and a controller that controls one or more characteristics of the cavity or energy to assure that the UHF or microwave energy is deposited uniformly in the object within ±30%, 20% or 10% over at least 80% or 90% of the volume of the object.

Optionally, the at least one feed comprises a plurality of feeds.

In an embodiment of the invention, the one or more controlled characteristics include a frequency of the energy inputted at one or more feeds. Alternatively or additionally, the one or more controlled characteristics include a position or orientation of a field adjusting element inside the cavity. Optionally, the characteristics are controlled to provide a desired net efficiency of power into the cavity.

There is further provided, in accordance with an embodiment of the invention, a method of heating an irregularly shaped object, the method comprising:

placing the object in a cavity of a heater;

feeding UHF or microwave energy into the heater;

controlling one or more of the characteristics of the cavity or energy to assure that the UHF or microwave energy is deposited uniformly in the object within ±30%, 20% or 10% over at least 80% or 90% of the volume of the object.

In an embodiment of the invention, the one or more controlled characteristics include a frequency of the energy inputted at one or more feeds. Alternatively or additionally, the one or more controlled characteristics include a position or orientation of a field adjusting element inside the cavity. Optionally, the characteristics are controlled to provide a desired net efficiency of power into the cavity. Optionally, controlling the frequency comprises feeding energy at a plurality of frequencies covering a band of at least 0.5%.

On an embodiment of the invention, is frozen prior at the commencement of heating. Optionally, the object is heated until thawed. Optionally, the temperature differential in the object when thawing by said heating is complete throughout the object is less than 50° C., 20° C., 10° C., 5° C. or 2° C. In an embodiment of the invention, the frozen object is an animal or human organ.

There is further provided, in accordance with an embodiment of the invention, a method of heating an object in a cavity having at least one RF port, the method comprising:

feeding energy into at least one port; and varying the frequency of the energy during heating of the object so that it varies over a band greater than 0.5%, 2%, 5%, 10% or 20%.

In an embodiment of the invention, the frequency is swept across the band.

Optionally, the band is at least 20 MHz or 100 MHz wide.

There is further provided, in accordance with an embodiment of the invention, electromagnetic heating apparatus, comprising:

a cavity;

at least one UHF or microwave energy feed; and at least one adjustable field adjusting element situated within the cavity.

Optionally, the at least one field adjusting element is a metal element.

Optionally, the at least one adjustable field adjusting element is rotatable to produce a desired power coupling. Alternatively or additionally, the at least one field adjusting element is able to slide to produce a desired power coupling. Optionally, the at least one adjustable field adjusting element comprises a plurality of independently adjustable elements.

There is further provided, in accordance with an embodiment of the invention, a method for electromagnetic heating, comprising:

placing an object to be heated into a cavity;

feeding UHF or microwave energy into the cavity; and adjusting a characteristic of the cavity to achieve a desired uniformity of heating.

Optionally, the cavity comprises at least one adjustable field adjusting element within the cavity; and wherein adjusting the cavity comprises adjusting the at least one field adjusting element.

Optionally, the at least one adjustable field adjustable element comprises a plurality of said elements.

Optionally, adjusting is performed at least once as heating proceeds.

There is further provided, in accordance with an embodiment of the invention, apparatus for electromagnetic heating comprising:

a cavity;

a plurality of feeds (optionally 2, 3 or 6) which feed UHF or microwave energy into the cavity;

a controller that determines the efficiency of net power transfer into the cavity and adjusts the frequency of the plurality of inputs such that the efficiency of net power transfer into the cavity is controlled.

Optionally, the controller adjusts the frequency during the period between commencement and ending of heating.

Optionally, the apparatus comprises at least one adjustable field adjusting element situated in the cavity. Optionally, the controller adjusts the field adjusting elements to enhance the efficiency of net power transfer.

Optionally, the controller adjusts the frequency as heating proceeds.

Optionally, the controller is configured to feed at least two of the frequencies at different power.

Optionally the controller sweeps the frequency as heating proceeds.

There is further provided, in accordance with an embodiment of the invention, a method of electromagnetic heating comprising:

placing an object to be heated into a cavity;

feeding UHF or microwave energy into the cavity via a plurality of feeds;

determining the efficiency of net transfer of energy into the cavity for each of the feeds as a function of frequency over a range of frequencies; and adjusting the frequencies of the energy fed, responsive to the determined efficiency function.

In an embodiment of the invention, the method includes adjusting the frequency as heating proceeds.

Optionally, the method includes sweeping the frequency over the band.

Optionally, the method includes adjusting the power at each feed responsive to the efficiency function as the frequency is adjusted.

In an embodiment of the invention, the overall efficiency of energy transfer into the object to be heated as compared to the energy fed into the feeds is greater than 40% or 50%.

There is further provided, in accordance with an embodiment of the invention, apparatus for electromagnetic heating comprising:

a cavity;

at least one feeds which feed UHF or microwave energy into the cavity;

a controller that determines a change in a desired frequency of energy as heating proceeds and changes the frequency by at least one MHz, 10 MHz or 25 MHz.

In an embodiment of the invention, the desired frequency change is determined from a measurement of the net efficiency of energy transfer to the cavity over a band of frequencies.

There is further provided, in accordance with an embodiment of the invention, a method of electromagnetic heating comprising:

placing an object to be heated in a cavity; and changing a frequency of UHF or microwave energy fed into the cavity for heating the object by at least 1 MHz, 10 MHz, 25 MHz or 25 MHz during the course of the heating.

In an embodiment of the invention, the desired frequency change is determined from a measurement of the net efficiency of energy transfer to the cavity over a band of frequencies.

In an embodiment of the invention, the frequency is swept over at least one sub-band of frequency of at least 5 MHz.

In an embodiment of the invention, the power is adjusted for each frequency responsive to the measurement of the net efficiency.

There is further provided, in accordance with a method of electromagnetic heating comprising:

placing an object to be heated into a cavity; and feeding UHF or microwave energy into the cavity via a plurality of feeds;

wherein the frequencies of the energy fed to two of the feeds differs by at least 8 MHz, or 20 MHz.

In an embodiment of the invention, the net energy fed into the object from each of the plurality of feeds is equal to within 25%.

There is further provided, in accordance with an embodiment of the invention, a method of electromagnetic heating, comprising:

subjecting an object that is to be heated to UHF or microwave energy in an amount capable of heating the object;

determining a characteristic of the heating process that is responsive to a change in state of the object; and adjusting the heating when a desired state is achieved.

There is further provided, in accordance with an embodiment of the invention, a method of electromagnetic heating, comprising:

subjecting an object that is to be heated to UHF or microwave energy in an amount capable of heating the object;

determining an amount of energy that is absorbed by the object; and adjusting the heating when a desired amount of energy is absorbed.

There is further provided, in accordance with an embodiment of the invention, apparatus for electromagnetic heating comprising:

a cavity;

at least one feed for UHF or microwave energy; and a source of static or low frequency electric or magnetic field arranged to subject an object in the cavity to an electric or magnetic field, effective to affect the heating of an object in the cavity.

There is further provided, in accordance with an embodiment of the invention, a method of electromagnetic heating comprising:

subjecting an object to be heated to UHF or microwave energy in an amount suitable for heating the object; and subjecting the object during heating to a static or low frequency electric or magnetic field effective to increase the uniformity or efficiency of heating.

There is further provided, in accordance with an embodiment of the invention, apparatus for electromagnetic heating comprising:

a cavity;

at least one feed into the cavity that includes an antenna including a radiating element chosen from the group consisting of a patch antenna, a fractal antenna, a helix antenna, a log-periodic antenna, a spiral antenna and a wire formed into a partial loop that does not touch a wall of the cavity.

In an embodiment of the invention, the radiating element comprises an array of radiating elements.

In an embodiment of the invention, the at least one feed comprises a plurality of feeds and wherein the radiating elements of at least two feeds is different.

There is further provided, in accordance with an embodiment of the invention, a method of producing selective heating on a portion of an irradiated object comprising:

providing an object to be heated;

providing an energy concentrating element on, in or near the object;

placing the object and the energy concentrating element in a resonant cavity; and irradiating the object and the element to cause a concentration of energy at selected places in the object.

Optionally, the energy concentrating element is irradiated at a frequency at which it is resonant.

Optionally, the object and the element are placed in the cavity separately.

There is further provided, in accordance with an embodiment of the invention, an RF heater comprising:

a resonant cavity;

at least one source of microwave or UHF energy;

at least one feed for feeding energy generated by the at least one source into the cavity;

a power supply for the at least one source; and a housing for the RF heater, wherein the RF heater weighs 15 Kg, 10 Kg, 7 Kg or less.

In an embodiment of the invention, the resonant cavity has a volume of at least 20, 30 or 40 liters.

There is further provided, in accordance with an embodiment of the invention, a method of determining the temperature of a portion of an object being heated in an RF heater, comprising:

placing the object in resonant cavity of the heater;

providing a temperature sensitive sensor having a resonant frequency that varies with temperature;

irradiating the object with UHF or Microwave power via a feed; and determining the temperature based on energy reflected from the feed.

In an embodiment of the method comprises:

placing a non-temperature sensitive resonant element adjacent to the temperature sensitive element, wherein determining comprises determining based on a frequency difference between resonances of the temperature sensitive sensor and the non-temperature sensitive resonant object as indicated by said reflected energy.

In embodiment of the invention, the method comprises: controlling characteristics of the irradiation of the energy responsive to the determined temperature.

There is further provided, in accordance with an embodiment of the invention, a method for RF heating of an object in a cavity, comprising:

irradiating the object with UHF or Microwave energy;

adjusting the humidity of or cooling the air in the cavity.

In an embodiment of the invention adjusting the humidity of or cooling the air in the cavity comprises adjusting the humidity of the air in the cavity. Additionally, the temperature may be adjusted. Alternatively or additionally to adjusting the humidity adjusting the humidity of or cooling the air in the cavity comprises cooling the air in the cavity.

There is further provided, in accordance with an embodiment of the invention, an RF heater comprising:

a resonant cavity;

at least one RF source having a power output of at least 50 watts and being sweepable over a frequency range of greater than 0.5% with an efficiency of greater than 40% at least one feed for feeding energy generated by the at least one source into the cavity;

a power supply for the at least one source; and a housing for the RF heater.

Optionally, the RF source comprises:

a signal generator that produces selective frequencies within the band; and an RF amplifier.

Optionally, the at least one RF source comprises a plurality of sources.

Optionally, the at least one feed comprises a plurality of feeds.

Optionally, the at least one RF source comprises one or both of a UHF source or a Microwave source.

Optionally, the source is sweepable over a frequency range greater than 2%, 5%, 10%, 20% or 25%.

Optionally, the power output available for each feed is at least 200 Watts or 400 Watts.

There is further provided, in accordance with an embodiment of the invention, an RF heater comprising:

a resonant cavity;

at least one RF source having a power output of at least 50 watts and being sweepable over a frequency range of greater than 200 MHz with an efficiency of greater than 40% at least one feed for feeding energy generated by the at least one source into the cavity;

a power supply for the at least one source; and a housing for the RF heater.

Optionally, RF source comprises:

a signal generator that produces selective frequencies within the band; and an RF amplifier.

Optionally, the at least one RF source comprises a plurality of sources.

Optionally, the at least one feed comprises a plurality of feeds.

Optionally, the at least one RF source comprises one or both of a UHF source or a Microwave source.

Optionally, the power output available for each feed is at least 200 Watts or 400 Watts.

There is further provided, in accordance with an embodiment of the invention, a package suitable for use in an RF heating oven, comprising at least one indicator having a machine-readable indication of heating instructions thereon, which indication indicates uniform or controlled heating instructions.

In an embodiment of the invention, the machine readable indication is readable by a scanning RF field in an RF cavity.

BRIEF DESCRIPTION OF THE DRAWINGS

Exemplary non-limiting embodiments of the invention are described below with reference to the attached figures. The drawings are illustrative and generally not to an exact scale. The same or similar elements on different figures are referenced using the same reference numbers.

DETAILED DESCRIPTION OF EXEMPLARY EMBODIMENTS

Figure 1A:
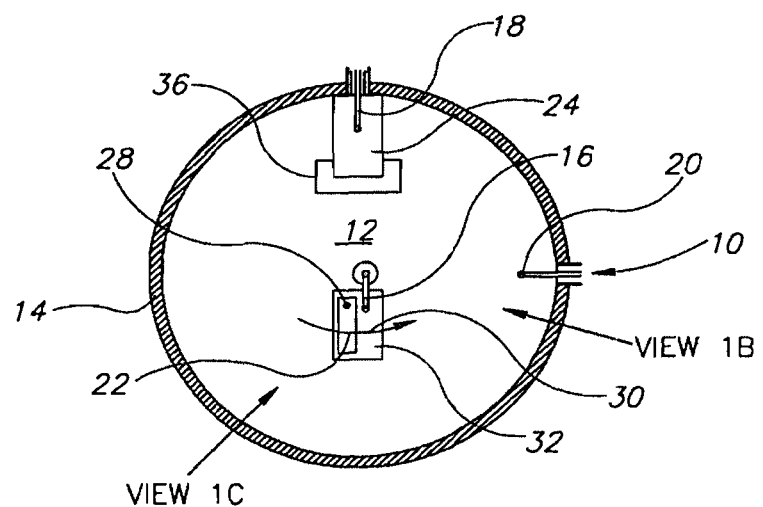
FIGS. 1A, 1B and 1C are respective schematic top and side section views of a cavity 10, in accordance with an exemplary embodiment of the invention.

The present application describes a number of advances in the field of RF heating (e.g. microwave or UHF) heating. While, for convenience these advances are described together in the context of various apparatus and methods, each of the advances is generally independent and can be practiced with prior art apparatus or method (as applicable) or with a non-optimal version of the other advances of the present invention. Thus, for example, parts of the method of adjusting the input power can be used with the prior art apparatus of Penfold, et al., referenced above. Conversely, the inventive apparatus of the present invention (or parts thereof) can be used with the method of Penfold et al. It is expected that these combinations will not be ideal, but they are expected to give improved results over the prior art apparatus and methods.

Furthermore, advances described in the context of one embodiment of the invention can be utilized in other embodiments and should be considered as being incorporated as optional features in the descriptions of other embodiments, to the extent possible. The embodiments are presented in somewhat simplified form to emphasize certain inventive elements. Furthermore, it is noted that many features that are common to most or all embodiments of the invention are described in the Summary of the Invention and should also be considered as being part of the detailed description of the various embodiments.

The following are believed to novel features or variations present in some or all the embodiments described. It is understood that not all of these features may be present in any particular embodiment and that not all features are described for every embodiment for which they are applicable.

1) An apparatus and method that allow for RF heating an irregular object such that the temperature of the object is uniform within 50° C. (optionally, to within 10, 6, 4 or 2° C.) when heating is completed. Exemplary embodiments provide this uniformity mainly by directly RF heating the object such that over 50% of the heating is by direct RF heating and not by conduction from other portions of the device. In some embodiments of the invention, such direct RF heating can reach 70, 80, or 90 or more percent.

2) An apparatus that includes field adjusting elements inside the cavity and method of designing and using same.

3) A heating apparatus with one or more coupling antenna for coupling energy into the cavity; a method of designing said antenna; and method of feeding energy to the heater including a method of tuning the radiated pattern of the antenna. This includes, utilizing an antenna array (with one or more feeds, having controlled phases), loop antenna, wide band antenna, fractal antenna, directional antenna, helix antenna, operating the antennas separately or coherently, designing the antenna to obtain a desired radiated pattern etc.

4) An apparatus and method to gain knowledge of a heating process before, and potentially also several times during, heating (e.g. several times a second) using a measurement of the efficiency of absorption of energy in the object being heated as function of frequency 5) An apparatus and method that is adapted to control one or more characteristics of the heating process, for example the amount of power absorbed in the heated object, based on the measurement of energy absorption efficiency (e.g. by transmitting power to compensate for the variations of energy absorption). This may be done by adjusting, for example, input power at each transmitted frequency and/or choosing frequencies to be transmitted and/or moving the field adjusting element's and/or moving the heated object and/or changing the antennas characteristics. This may be done before operation, and preferably also one or more times during operation (e.g. several times a second), based on measurements of energy absorption during heating or during a short hiatus in the heating.

6) An apparatus and method for applying a DC or low frequency electric (e.g. below 300 MHz, or below some other value substantially lower that the heating frequencies used) or magnetic field to the object during RF heating. Such application is believed to change the dielectric properties of the object being heated and this provides yet another method of adjusting the power provided to the object being heated.

7) An apparatus and method in which during operation the transmitted frequencies and/or power from one or more feeds are varied in a controlled manner to get a desired heating pattern (e.g. by more than 1, 2 or 5 MHz). This variation may occur several times during operation (e.g. several times a second). In an embodiment of the invention, the desired pattern is a uniform heating pattern.

8) Apparatus and method of controlling heating based on reading of dielectric characteristics of the heated object. Reading may be obtained one or more times during heating (e.g. several times a second). For example end of thawing or boiling process, when a phase change is sensed. This can implement a cessation of heating.

9) An electromagnetic heater including multiple inputs in which the frequencies of the inputs are different by more than 5, 10 or 25 MHz.

10) An electromagnetic heater including multiple inputs in which the frequencies of at least one of the inputs changes dynamically during heating such that the frequencies at the inputs vary by 5 MHz or more.

11) An apparatus that utilizes a wideband and high efficiency (above 40%) solid state microwave amplifier to feed energy into the cavity and optionally utilize waste heat generated by the generator to heat the air in the cavity.

12) An apparatus that utilizes wasted heat generated by the RF energy generator to heat a medium, for example air in the cavity, or water, as in a water heater.

13) A method of causing a resonance structure and/or designed pattern, inside a resonator to radiate by (selectively or generally) irradiating said resonance structure and/or designed pattern thus using it as a radiation source (i.e. creating a passive source) and an apparatus comprising same.

14) Apparatus and method of using RF reflecting object, such as metals, for concentration of energy in close environment of these objects, inside a resonator, for example within the heated object or in the close environment of the heated object.

15) Apparatus and method of high-efficiency (at least 50%, at times above 70% or even 80%) RF heater. The efficiency is defined as power absorbed in the object versus power at the output of the power source. This opens the possibility of a heater that operates from a solar energy source.

16) An RF heater weighing less than 15 Kg, or even less than 10 Kg. In accordance with some embodiments of the invention a the use of a high efficiency solid state amplifier rather than a microwave tube allows for using a low weight DC power source instead of the heavy duty transformer. This heat saving is additional to the replacement of a heavy magnetron with a light solid state amplifier. Furthermore, the high efficiency eliminates the need for a heat sink, e.g. by using the resonator as a heat sink. In some embodiments of the invention, the requirement for a heat sink is obviated or partly reduced by feeding the waste heat from the amplifier back into the microwave cavity.

17) Apparatus and method of temperature information of a heated object using a TTT (a temperature sensitive, preferably passive Temperature transmitting tag the resonance of which changes due to temperature changes or which transmits the temperature information using a modulated response). This may be done if the TTT frequency is remote from the transmittal range of the device, or if the TTT's frequency is within the device's band width, and avoiding the specific TTT frequencies during heating. In some embodiments of the invention a tag having two resonant elements, one that is temperature sensitive and one that is not can be used since measurement of frequency difference is more accurate than measurement of absolute frequency.

18) An apparatus and method for RF heating including means for chamber environment control (e.g. introduction and/or removal of humidity, cooling and/or warming etc.). For example, in the case of an egg being boiled, heating would reduce the temperature gradient (and therefore stress) across the egg shell, thus reducing the chances of cracking and bursting. Optionally, the air temperature in the chamber may be varied with time, depending on the present temperature of the object and objectives such as causing condensation that closes the object being heated (such as meat).

19) An apparatus in which the power absorbed by the object being heated can be calculated based on knowledge of power input and efficiency of power transfer to the object being heated. This allows for the calculation of a current temperature and/or a turn off-time based on actual heating rather than some estimated heating time as presently used with microwave cookers.

Figure 1B:
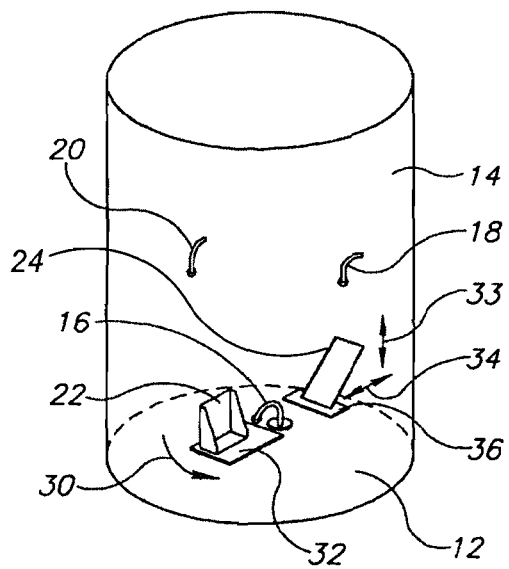
Figure 1C:
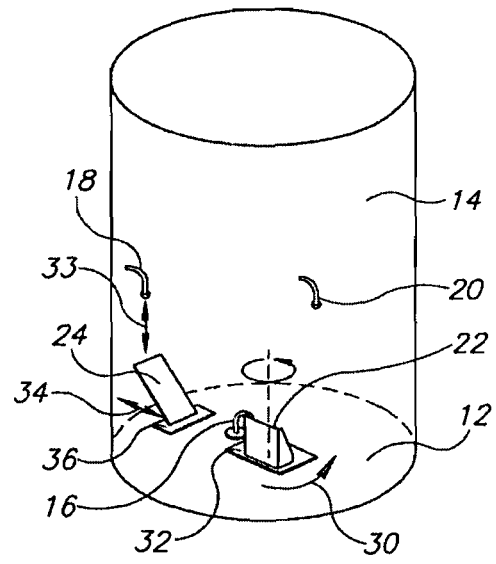

FIGS. 1A, 1B and 1C show respective top and side section views of a cavity 10, in accordance with an exemplary embodiment of the invention.

Cavity 10, as shown is a cylindrical cavity made of a conductor, for example a metal such as aluminum, and is resonant in the UHF or microwave range of frequencies, optionally between 300 MHz and 3 GHz, more preferably between 400 MHz and 1 GHZ. In some embodiments of the invention, the cavity is a spherical, rectangular or elliptical cavity. However, it should be understood that the general methodology of the invention is not limited to any particular resonator cavity shape.

Figure 4A:
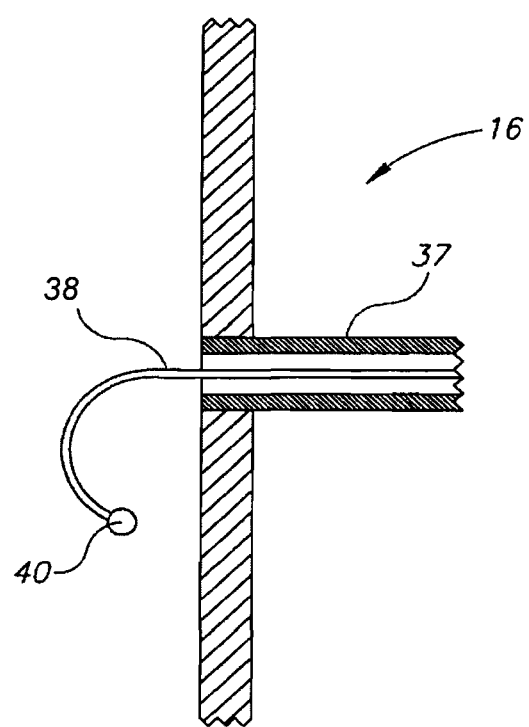
FIG. 4A is a schematic drawing of an antenna useful for coupling energy into the cavity, in accordance with an embodiment of the invention.
Figure 4B:
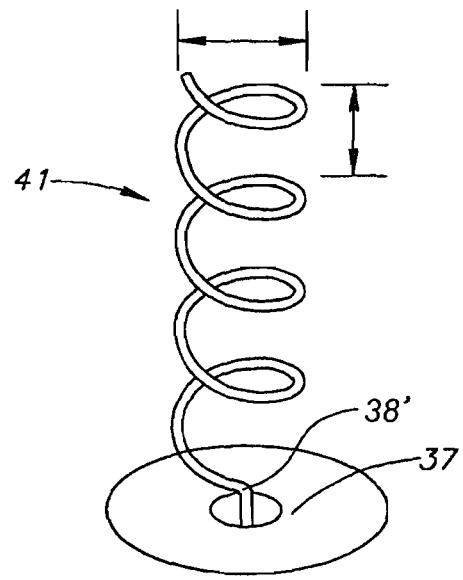
FIG. 4B is a schematic drawing of a helical antenna useful for coupling energy into the cavity, in accordance with an embodiment of the invention.
Figure 4C:
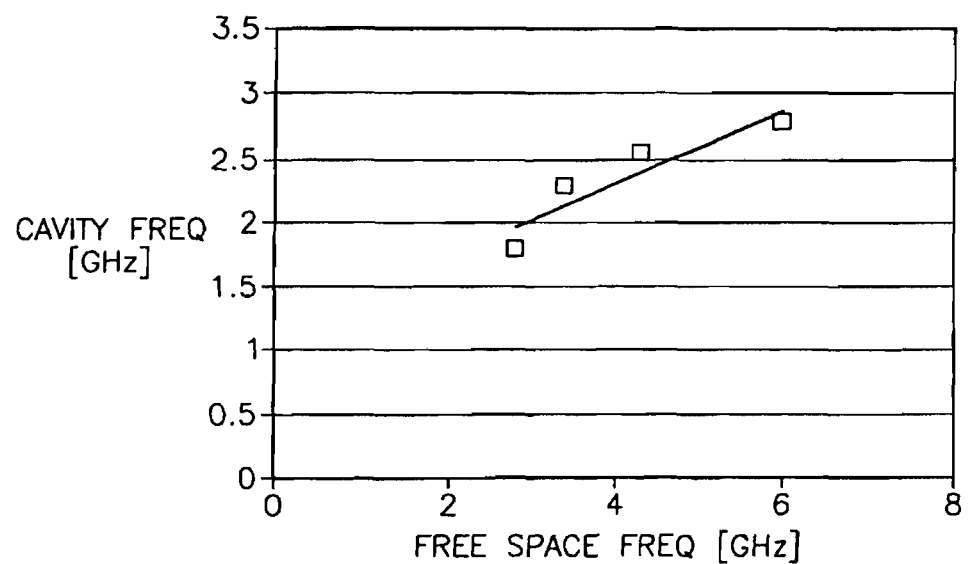
FIG. 4C shows a graph of correlation of free space matched frequencies and cavity matched frequencies of a helical antenna feed.

On one end 12 of the cylinder and on two sides of the cylindrical portion 14 feed antennas 16, 18 and 20 are positioned to feed energy at a frequency which is optionally chosen using the methods described below. Various types exemplary but not limiting antennas useful in carrying out the invention are shown in FIGS. 4A-4C.

Figure 2A:
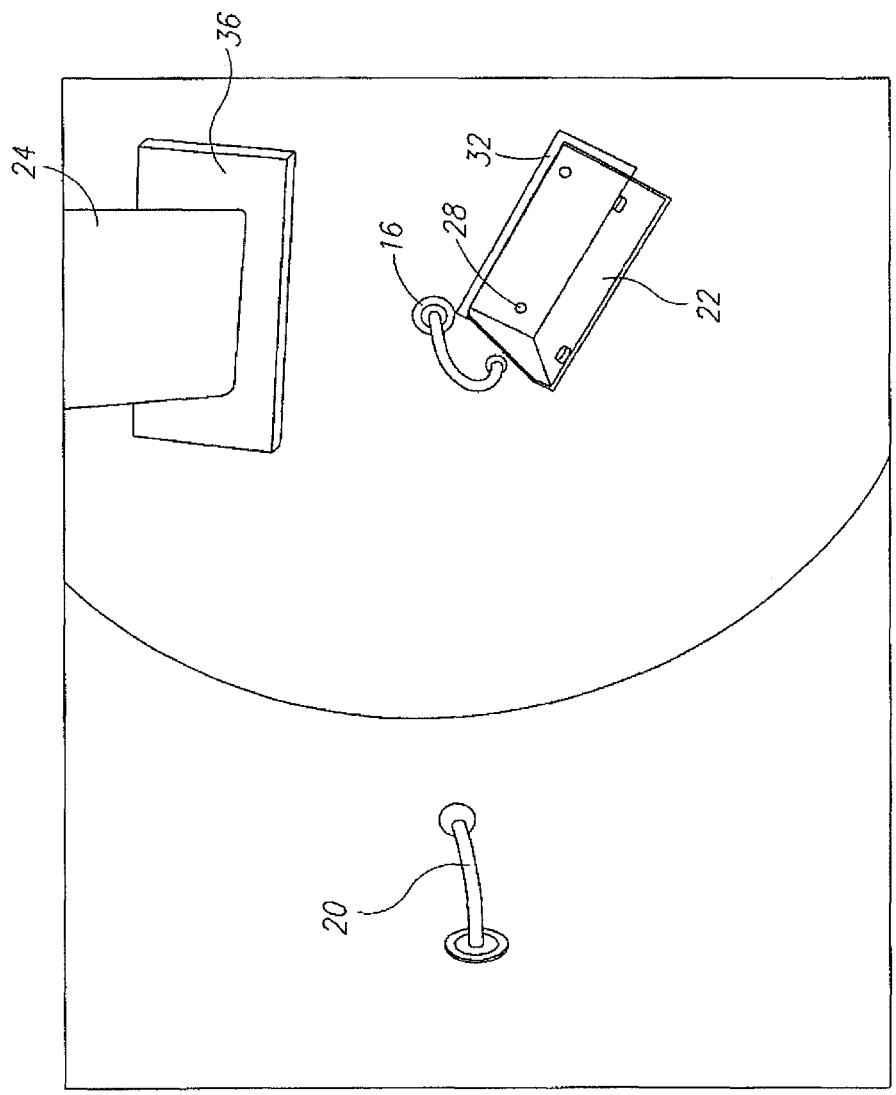
FIGS. 2A and 2B show two exemplary matching elements, in accordance with an embodiment of the invention.

In an exemplary embodiment of the invention, one or more matching elements 22, 24 are placed inside the cavity, optionally near the feed antennas. Two types of field adjusting elements are shown; however, other shapes and materials can be used. First field adjusting element 22, shown more clearly in FIG. 2A is situated on end 12 of cavity 10. In this embodiment the element is rotatable about an axis 28 attached to the end, in a direction 30. Optionally, it is insulated from the end by an insulating sheet 32 which couples element 22 capacitively to end 12. Alternatively it is conductively attached.

It is believed that element 22 (as well as the other field adjusting element) has a dual effect, when properly adjusted. On the one hand it changes the modes of the cavity in a way that selectively directs the energy from the feeds into the object to be heated. A second and related effect is to simultaneously match at least one of the feeds and reduce coupling to the other feeds.

Figure 2B:
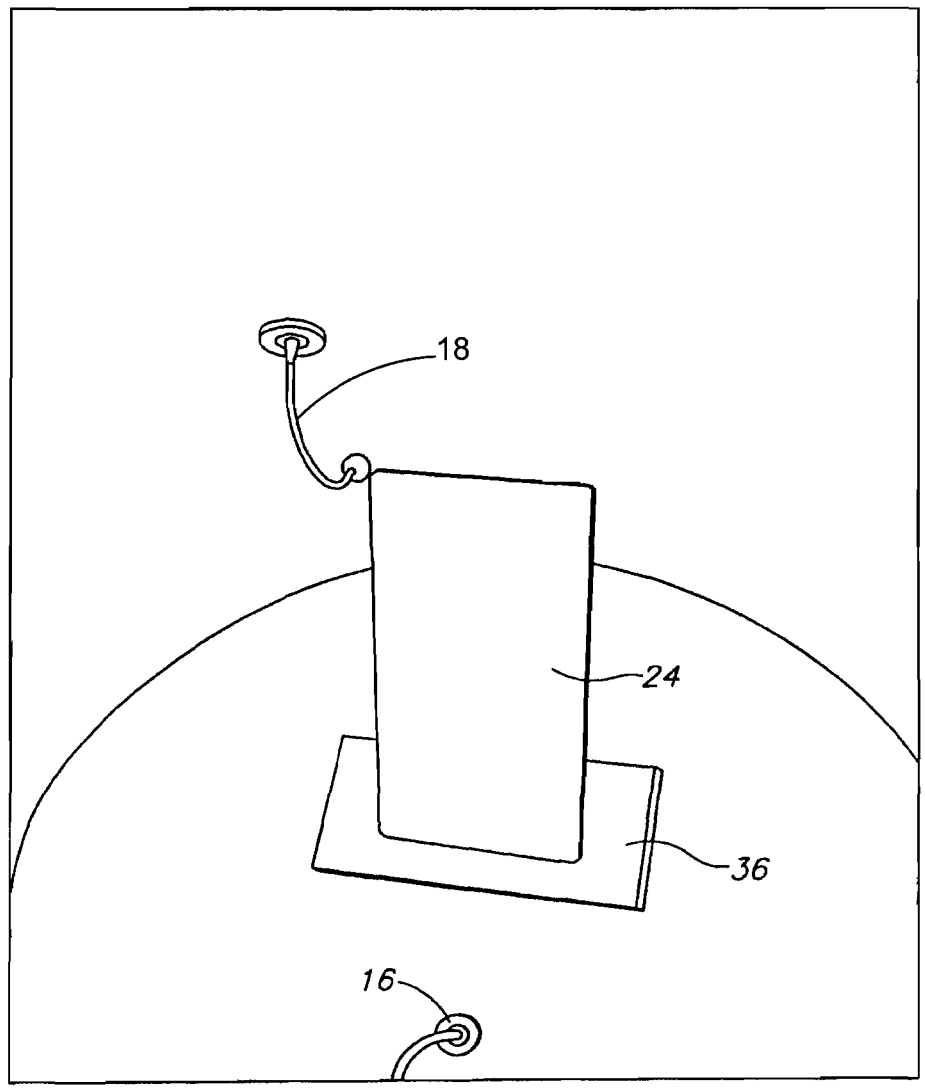

Field Adjusting element 24, shown more clearly in FIG. 2B is situated between feed 18 and end 12. One end of the element optionally is electrically attached to cylindrical portion 14 of the cavity. The other end of element 24 is spaced and insulted from end 12 by insulating material 36. It is free to slide along end 12 and cylindrical portion as shown by arrows 33 and 34. This sliding changes the spectral variation of the energy absorption efficiency.

Figure 3:
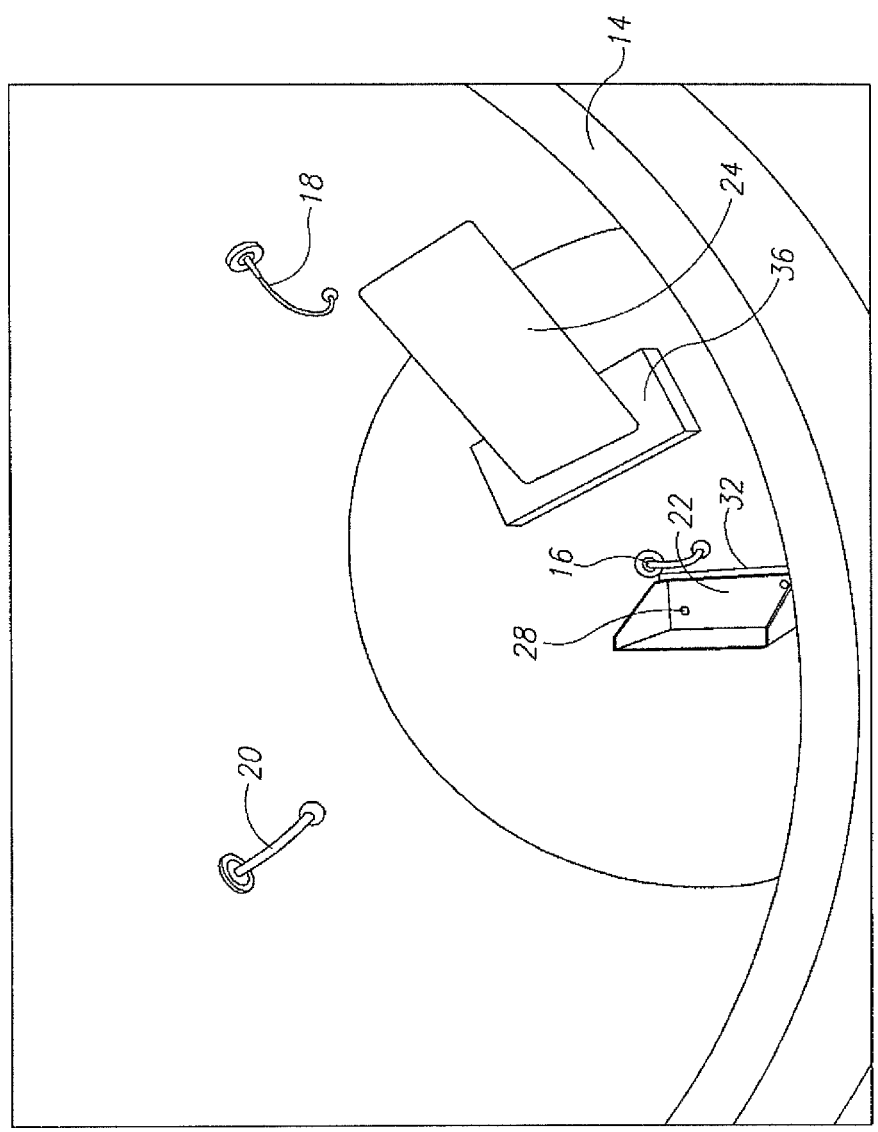
FIG. 3 is a schematic isometric drawing of the interior of the cavity of FIG. 1.

FIG. 3 is a perspective drawing of the interior of the cavity to more clearly show the position and orientation of the feed and elements.

FIGS. 4A-4H show three different types of antennas that are useful in carrying out the invention. These antennas are either novel per se, or if known have never been used for feeds in a microwave oven or heater, especially in a cavity type heater. In general, in most microwave cavity type heaters, the feeds used are not directional to any great extent and not wideband, as defined in free air. The object of the feeds is to excite the modes of the cavity. Since the cavities of the prior art are excited at a single frequency or a narrow band of frequencies, the antennas were designed specifically to excite these modes. In addition, prior art microwave cavities use waveguides or loop antennas which are not designed to lower the coupling of energy from one feed to another (they generally have only a single feed). The present inventors have discovered that the use of directional antennae and/or wideband antennae allows for better coupling to the heated object and lower coupling to other feeds.

In some embodiments the antennas are supplied as arrays. There are some advantages in using an antennas array. The band may be larger and there is a lower dependence of the heated object location on the results. The directivity may be controlled, even adjusted during heating. It is possible to control the phase of every single antenna of the array, controlling the RF mode. It is possible to alter the antenna structure, for example, using the helix antenna, the radius and the height of the antenna may be changed in order to tune the impedance and change the RF mode.

FIG. 4A shows an antenna useful for coupling energy from feeds 16, 18 and 20 into cavity 10, in accordance with an embodiment of the invention. As shown, feed 16 includes a coaxial feed 37 with its center conductor 38 bent and extending into the cavity. The center conductor is bent but does not touch the walls of the cavity. Optionally, the end of the wire is formed with a conductive element 40 to increase the antenna bandwidth. The present inventors have found that antennas of the type shown are able to couple energy better to an irregular object in the cavity. It is believed that such antennas transmit directionally and if the bend is aimed toward the object being heated, then coupling to the object (as opposed to coupling to the cavity) will be improved.

FIG. 4B shows a helix antenna 41 useful for coupling energy from feeds 16, 18 and 29 into cavity 10, in accordance with an embodiment of the invention. As shown feed 16 include a coaxial feed 37 with its center conductor 38' having an extension that is formed into a helix. This antenna can be designed for matching into free space over a relatively wide band of frequencies (such as that useful for the present invention) and can be made more or less directional by changing the number of turns. The free space design is then adjusted for the presence of the cavity as described below with respect to FIG. 4C. The graph of FIG. 4C shows experimental results for a helix of 7 turns, with a diameter equal to the free space wavelength and a turn pitch of less than 0.2 wavelengths. However, the present inventors have found that curves of the type shown in FIG. 4C can be found, by experimentation, for other turn characteristics as well.

Fractal antennas are known in the art. Reference is made to Xu Liang and Michael Yan Wan Chia, "Multiband Characteristics of Two Fractal Antennas," John Wiley, MW and Optical Tech. Letters, Vol. 23, No. 4, pp 242-245, Nov. 20, 1999. Reference is also made to G. J. Walker and J. R. James, "Fractal Volume Antennas" Electronics Letters, Vol. 34, No. 16, pp 1536-1537, Aug. 6, 1998. These references are incorporated herein by reference.

Figure 4D:
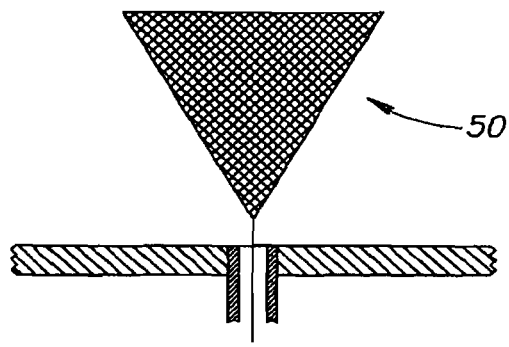
FIGS. 4D-4H are schematic drawings of various fractal antennas useful for coupling energy into the cavity, in accordance with an embodiment of the invention.

FIG. 4D shows a simple bow-tie antenna 50 as known in the art, for radiation into free space. The Bandwidth of the bow-tie (in free space) is: 604 MHz @ 740 MHz center frequency (−3 dB points) and 1917 MHz @ 2.84 GHz center frequency. This antenna has a monopole directivity pattern but a broadband one (being an advantage over the narrow BW of a dipole antenna). However, monopole directivity does not irradiate in a direction parallel to the feed.

The band width (BW) of this antenna varies between 10 MHz and maximum of 70 MHz depends of the load (object) position inside the cavity.

This and the following fractal antennas can be useful in the present invention to feed energy into a cavity.

Figure 4E:
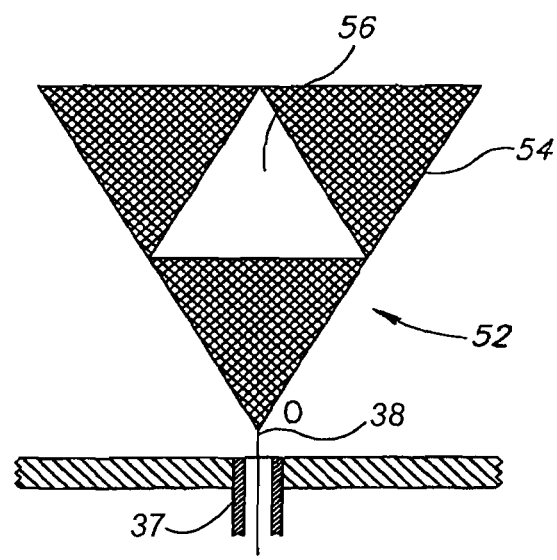

FIG. 4E shows a simple Sierpinski antenna 52, useful in the practice of the present invention. Generally, the cross-hatched areas 54 are metal plate and the white central area 56 is a non-conducting region. The metal plates are mounted on a preferably low dielectric constant dielectric and are connected at the corners and to center conductor 38 of coaxial feed 37, as shown. It's characteristics in the cavity are similar to those of the bow-tie antenna.

Figure 4F:
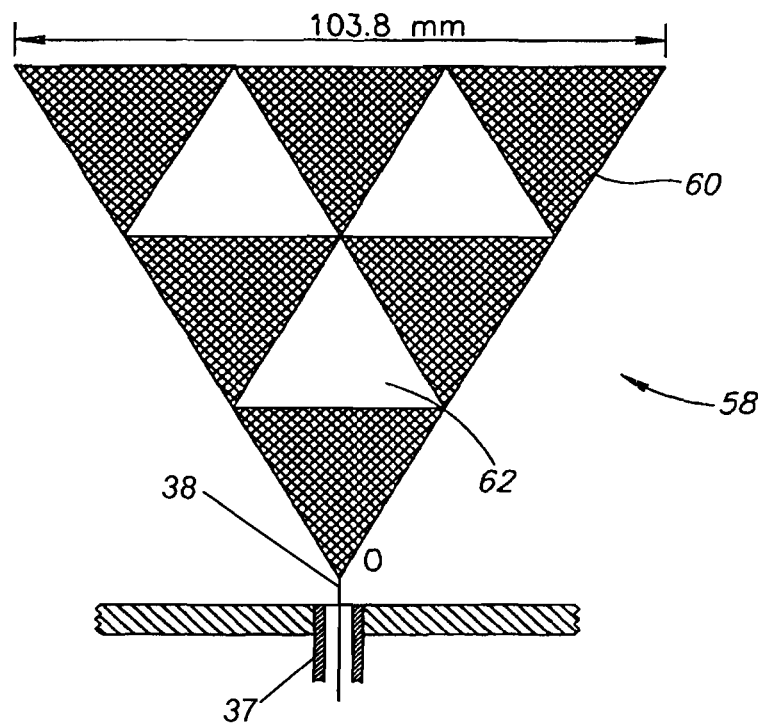

FIG. 4F shows a modified Sierpinski antenna 58, useful in the practice of the present invention. Generally, the cross-hatched areas 60 are metal plate and the white areas 62 are non-conducting regions. The metal plates are mounted on a preferably low dielectric constant dielectric and are connected at the corners and to center conductor 38 of coaxial feed 37 as shown.

For an overall extent of 103.8 mm utilizing equal size equilateral triangles, the center frequency of this antenna is about 600 MHz inside the cavity.

Figure 4G:
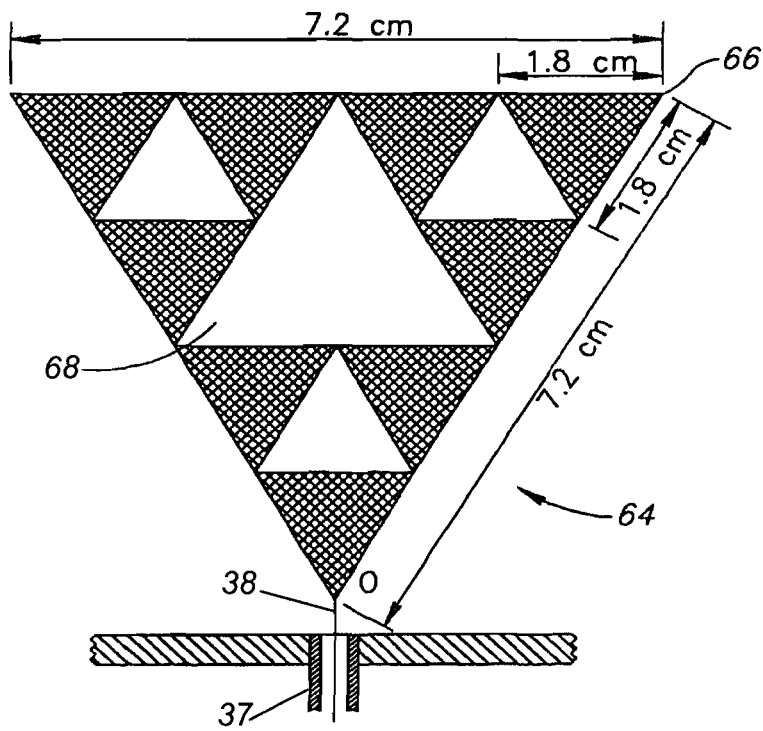

FIG. 4G shows yet another modified Sierpinski antenna 64, useful in the practice of the present invention. Generally, the cross-hatched areas 66 are metal plate and the white areas 68 are non-conducting regions. The metal plates are mounted on a preferably low dielectric constant dielectric and are connected at the corners and to center conductor 38 of coaxial feed 37.

Dimensions are shown on FIG. 4G for an antenna having a center frequency of 900 MHz in the cavity.

Figure 4H:
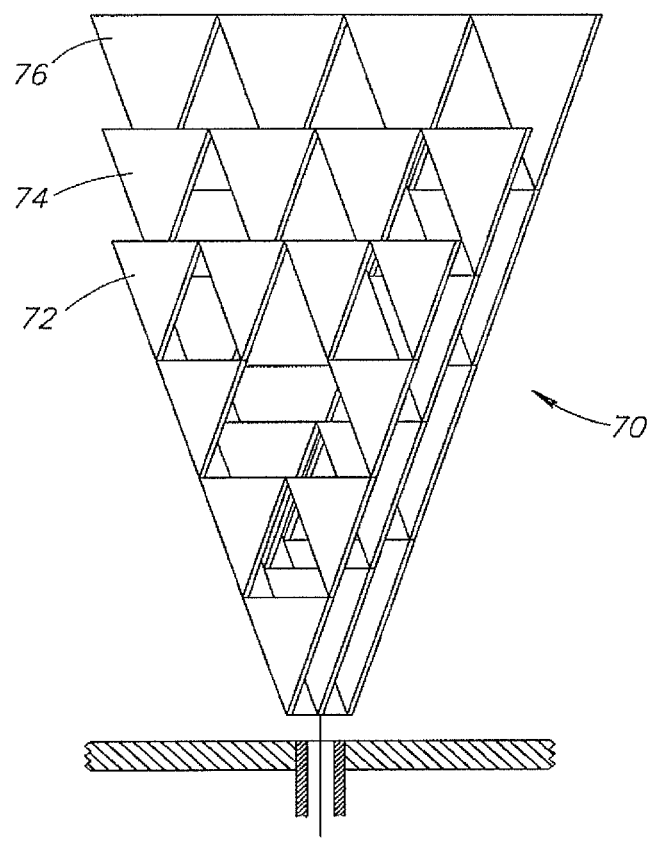

FIG. 4H shows a multi-layer fractal antenna 70 made up of three fractal antennas spaced a small distance (e.g. 2 mm) from each other.

The size of each of these antennas is staggered in order to broaden the bandwidth of the antenna. In the example shown a first antenna 72 is scaled to 0.8 of the dimensions given in FIG. 4G. A second antenna 74 has the same dimensions as the antenna of FIG. 4G and a third antenna 76 is increased in size over antenna 74 by a factor of 1.2. The volume fractal antenna (FIG. 4G) has an overall bandwidth of 100 MHz—this is an improvement over the 70 MHz maximum BW achieved in prior single fractal antenna (FIGS. 4D-4H).

Fractal antennas also show a center frequency change when placed in a cavity. This difference is used (as with the helical antenna to design antennas for use in cavities by scaling the frequencies.

In general, it is desired to utilize wideband, directional antennas to feed power into the object being heated such antennas include patch antennas, fractal antennas, helix antennas, log-periodic antennas and spiral antennas.

FIGS. 5A to 5D are schematic block diagrams of an electromagnetic heating system, in accordance with an embodiment of the invention.

Figure 5A:
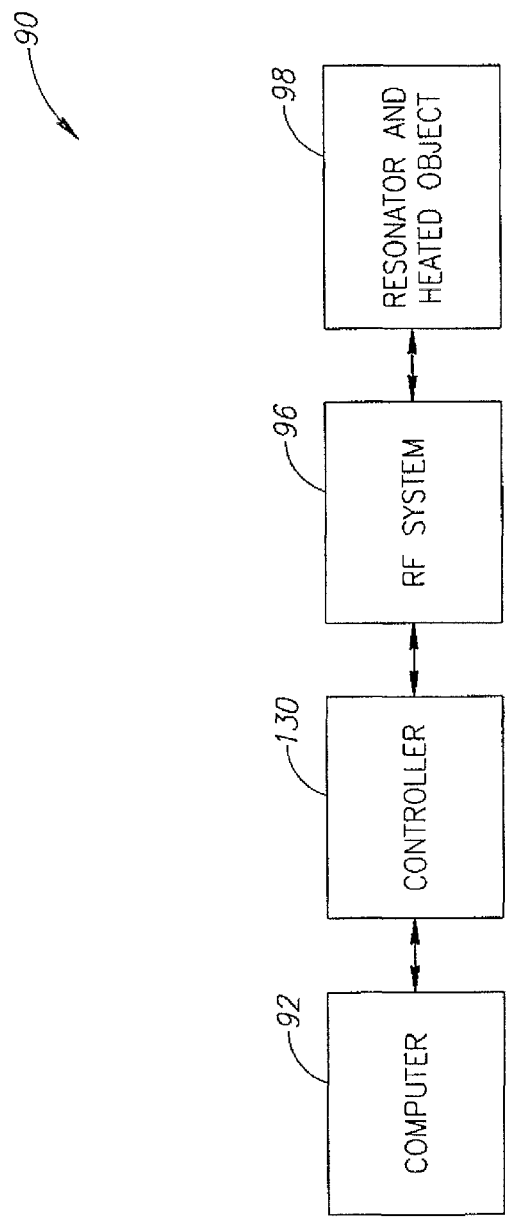
FIGS. 5A-5C are schematic block diagrams of electromagnetic heating systems, in accordance with an embodiment of the invention.

FIG. 5A shows a general block diagram of each of the power feeds 90 of the system, in an exemplary embodiment of the invention. The system is controlled by a computer 92 which via a control interface (also refer herein as Controller or control circuit) 130 controls an RF system 96 which provides power to the heated object 98.

Figure 5B:
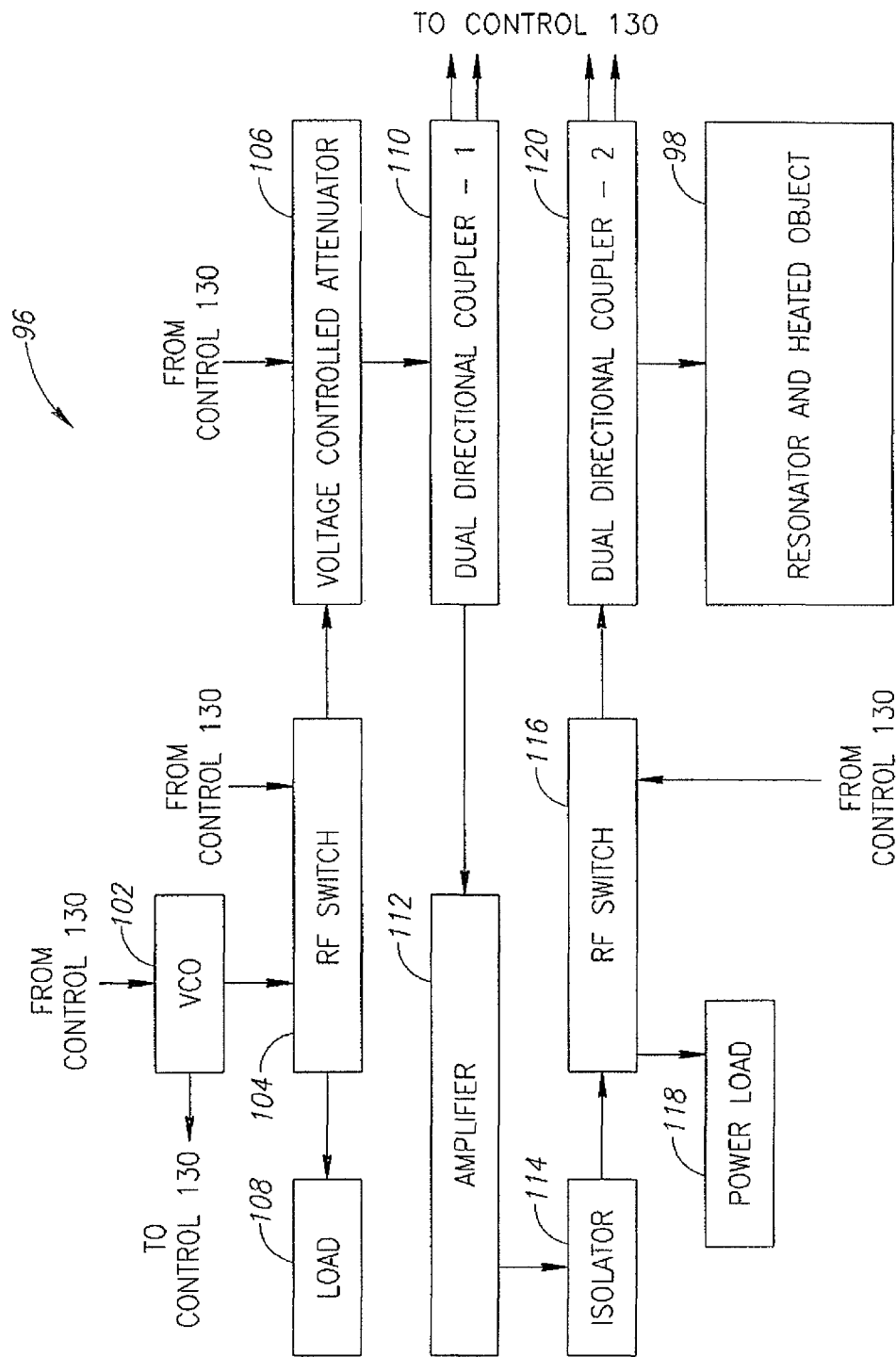

FIG. 5B is a block diagram of the electronics of one of the RF feed systems 96, in accordance with an exemplary embodiment of the invention. A VCO 102 receives a signal from a control circuit 130 (FIG. 5C) which sets the frequency of the energy into the port. This energy is passed through an RF switch 104 and a voltage controlled attenuator (VCA) 106, both of which are controlled by control circuit 130. After passing through the VCA 106, the power and frequency of the signal have been set. A load 108 is provided for dumping the signal generated by VCO 102 when the signal from VCO 102 is not switched to the VCA.

The signal is then sent through the main line of an optional first dual directional coupler 110.

The output of the VCA is then amplified by a power amplifier 112 and after passing though an isolator 114. A signal proportional to the power reflected from amplifier 112 is also fed to the control circuit.

Coupler 110 feeds back a portion of the signal entering it (after detection or measurement of power) to control circuit 130. A signal proportional to the power reflected by amplifier 112 is also sent to controller 130. These signals enable supervision of VCO/VCA and the amplifier. In a production system, the directional coupler may not be necessary.

An RF switch 116 switches the power either to a power load 118 or to the feed of resonator 98, via a second dual directional coupler 120. Dual directional coupler 120 samples the power both into and out of the resonator and sends power measurement signals to controller 130.

In an embodiment of the invention, RF amplifier 112 is a solid state amplifier based on the LDMOS technology. Psat=300 W, Efficiency=about 22%, Effective band—800-1000 MHz. Such amplifiers either have a relatively narrow bandwidth or a low efficiency (<25%) or both. This limits the optimal utility of the advances of the present invention. Recently, amplifiers have become available based on SiC (silicon carbide) or GaN (gallium nitride) semiconductor technology. Transistors utilizing such technologies are commercially available from companies, such as Eudyna, Nitronex and others. Amplifiers having a maximum power output of 300-600 W (can be built from low power (50-100 Watt) modules) and a bandwidth of 600 MHz (at 700 MHz center frequency) or a bandwidth of 400 MHz (at 2.5 GHz center frequency are available, for example. Such amplifiers have a much higher efficiency than prior art amplifiers (efficiency of 60% is available) and much higher tolerance to reflected signals, such that isolator 114 can often be omitted for these amplifiers. A particular configuration utilizing this type of amplifier is described below in conjunction with FIGS. 12A-D.

Figure 5C:
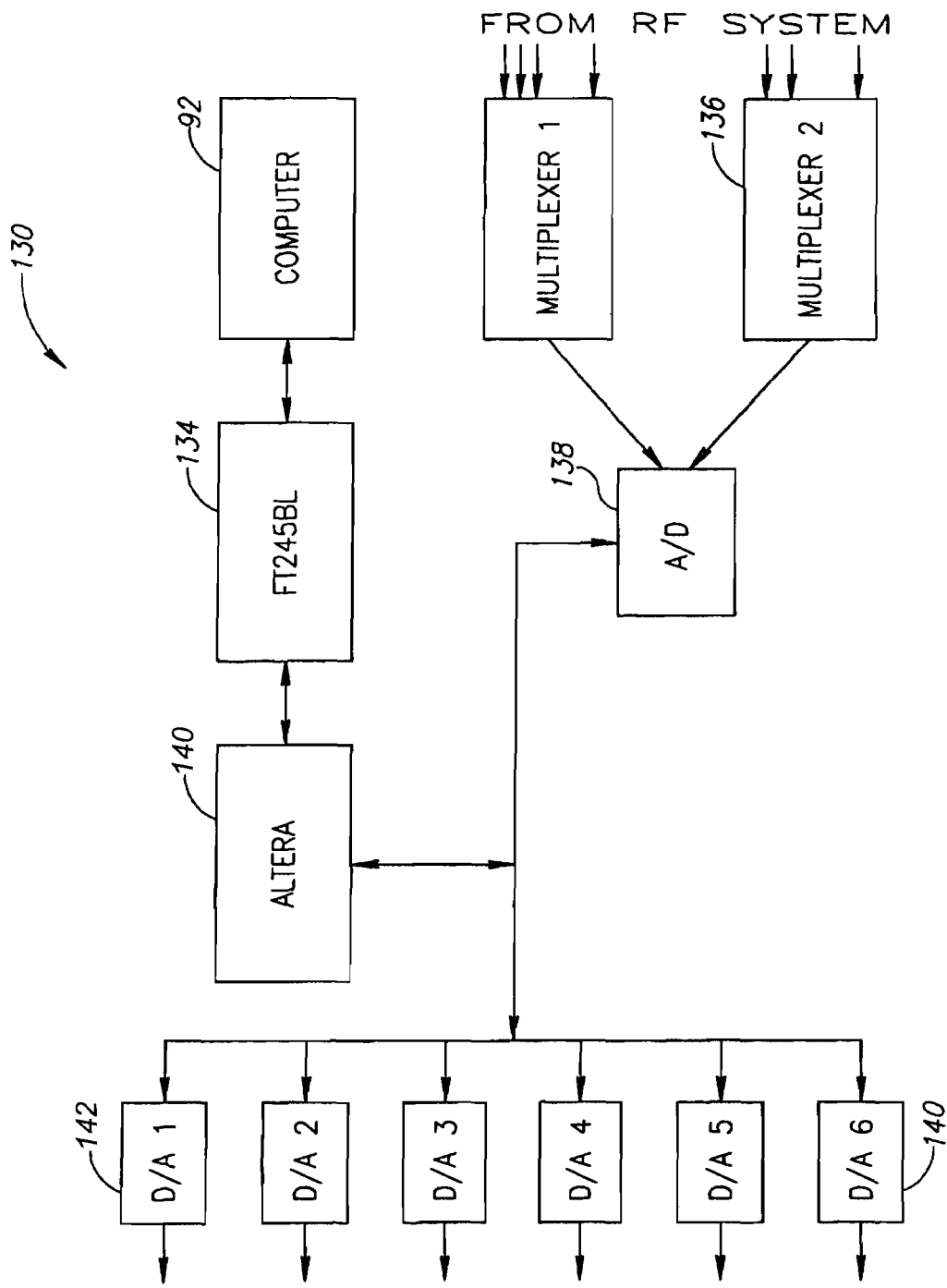

Turning now to FIG. 5C controller 130 comprises computer 92 which performs computations and provides a logging function of the system as well as acting as a user interface. It also controls the rest of the elements in performing the calibration and control method of the flow charts of FIG. 7.

Computer 92 is coupled to the rest of the system through an interface 134 which is designed to provide communication to, for example, an ALTERA FPGA 140, which interfaces with and provides control signals to the various elements of the RF system. The Altera receives inputs (as described above with respect to FIGS. 5A-5C), via one or more multiplexers 136 and an A/D converter 138. In addition, it sets the frequency and power of each of the feeds (also described with respect to FIGS. 5A and 5B) via D/A converters 142 and the positions of the field adjusting element optionally utilizing the method described with aid of the following flow charts. In a production system, the computer may not be necessary and the Altera or a similar controller may control and process all the necessary data. In some embodiments of the invention, the frequency is swept as described below.

Figure 6:
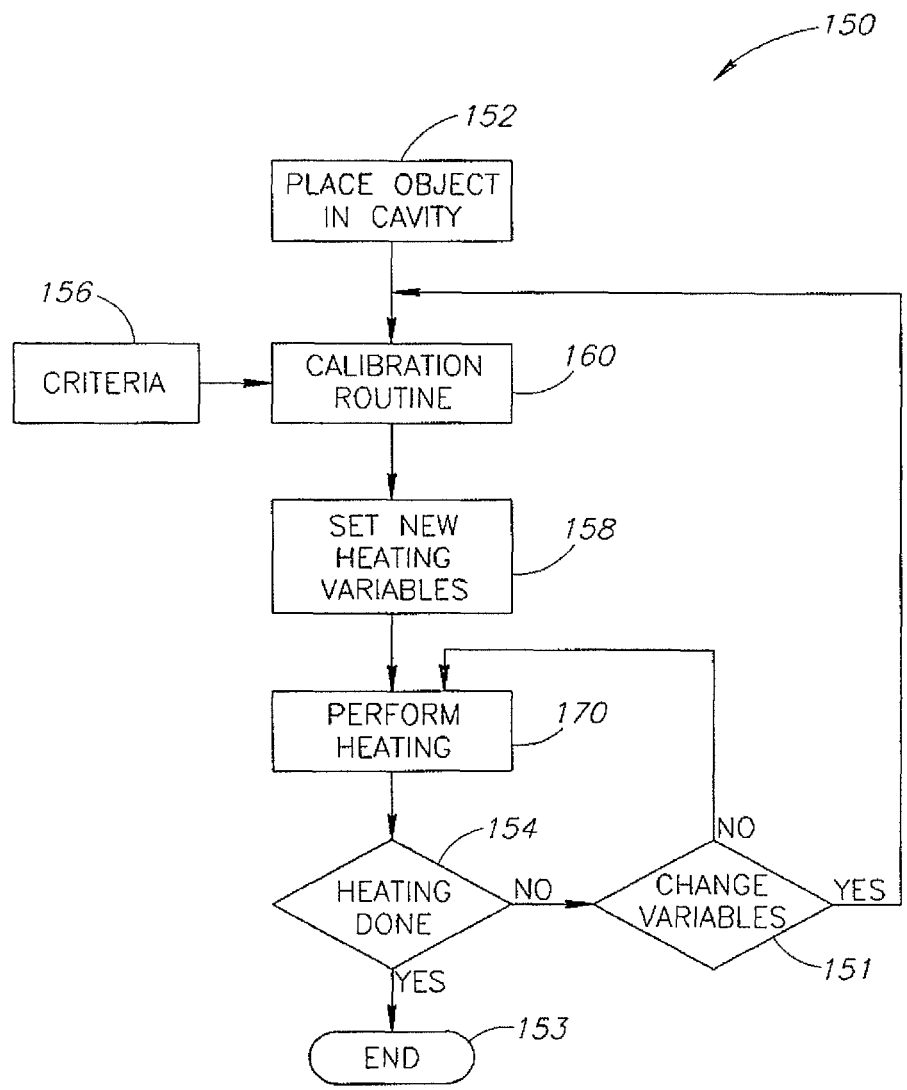
FIG. 6 is a simplified flow chart of the operation of the system, in accordance with an embodiment of the invention.
Figure 7:
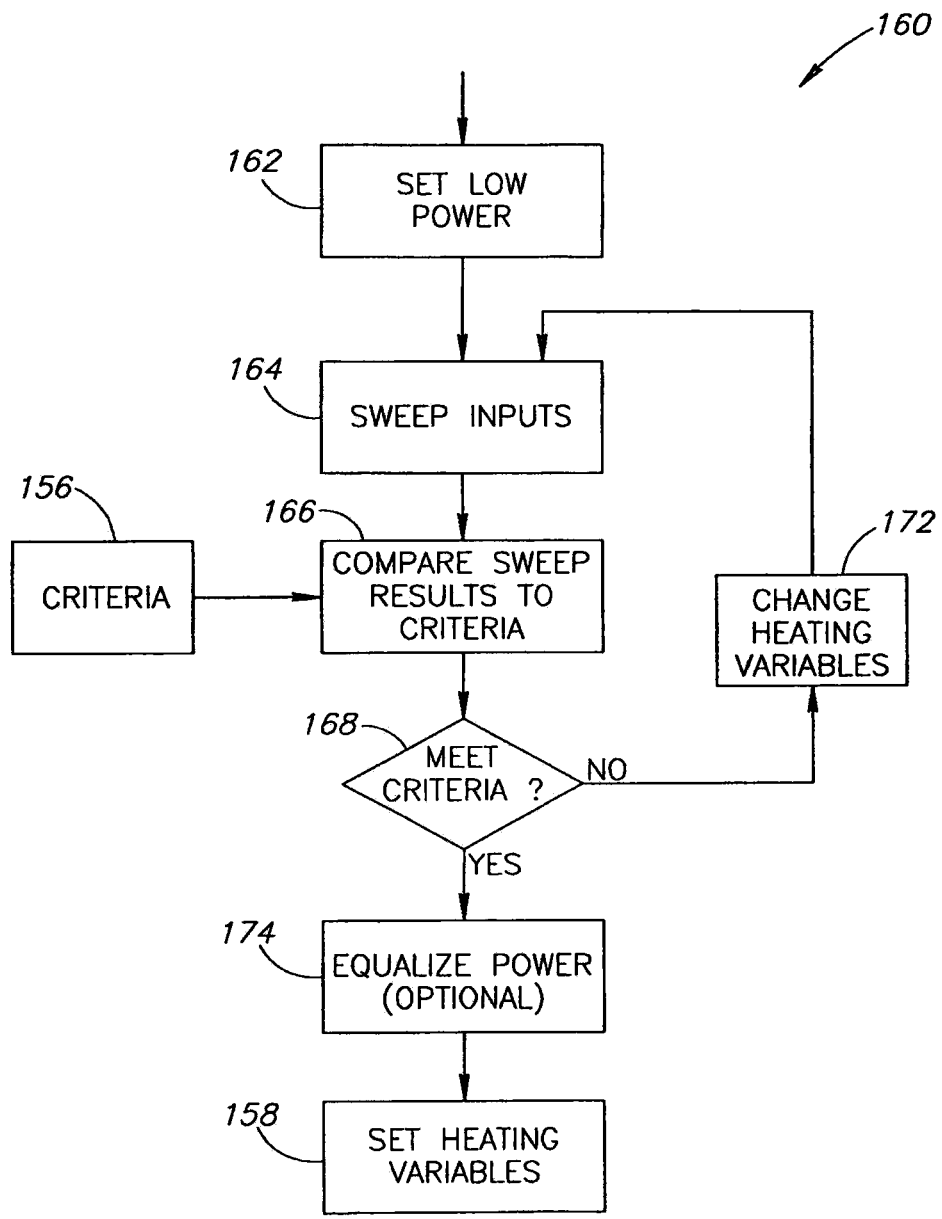
FIG. 7 is a flow chart of a process of adjusting elements and frequency in the heating systems illustrated in FIG. 5, in accordance with an embodiment of the invention.

FIG. 6 is a simplified flow chart 150 of the operation of a heating system having the structure described above. FIG. 7 is a simplified flow chart of calibration 160 of the system. As will be evident, the method operation and calibration of the system is also usable with only minor changes for operating systems with lesser or greater numbers of power feeds and/or a greater or less number of matching elements.

At 152 an object, for example a frozen organ or frozen or non-frozen food object, is placed in cavity 10. A calibration or adjustment routine is then optionally performed to set the variable elements in the system. These can include power output of the amplifiers 112 in each of the power feeds to the cavity at each frequency, chosen to be transmitted, the finite set of sub-bands of frequencies of each VCO 102, the method of providing energy at the various frequencies (for example sweep or other frequency variation, or the provision of a pulsed signal embodying the desired frequency and power characteristics), positioning of the matching elements (e.g., 22, 24), position of the heated object and any other variables that affect the various characteristics of the heating process, for example—the uniformity and/or efficiency of power transfer to the object. A memory contains the criteria 156 for calibrating the system. Exemplary criteria are described below. Calibration is carried 160 out to determine the new heating variables. An exemplary calibration routine is outlined in the flow chart of FIG. 7, discussed below.

After the new variables are determined, the new variables are set 158 and heating commences 170.

Periodically (for example a few times a second), the heating is interrupted for a short time (perhaps only a few milliseconds or tens of milliseconds) and it is determined 154, optionally based on a method described below, whether heating should be terminated. If it should, then heating ends 153. If the criterion or criteria for ending heating is not met, then a decision may be taken whether the heating variables should be changed 151. If the variables are to be changed (act 151—YES) the calibration (or re-adjustment) routine 160 is entered. If not (act 151 NO), the heating 170 is resumed. It is noted that during the measurement phase, the sweep is generally much broader than during the heating phase.

Calibration routine 160 for each individual channel will be described, with reference to the flow chart of FIG. 7.

In order to perform calibration, the power is optionally set at a level low enough 162 so that no substantial heating takes place, but high enough so that the signals generated can be reliably detected. Alternatively, calibration can take place at full or medium power. Calibration at near operational power levels can reduce the dynamic range of some components, such as the VCA, and reduce their cost.

Each of the inputs is then swept 164 between a minimum and a maximum frequency for the channel. Optionally, the upper and lower frequencies are 430 and 450 MHz. Other ranges, such as 860-900 MHz and 420-440 can also be used. It is believed that substantially any range between 300-1000 MHz or even up to 3 GHz is useful depending on the heating task being performed. When the broadband, high efficiency amplifiers described above are used, much larger bandwidth of several hundred MHz or more can be swept, within the range of the amplifiers. The sweep may be over several non-contiguous bands, if more than one continuous band satisfies the criteria for use in heating.

The input reflection coefficients $S_{11}$, $S_{22}$, and $S_{33}$ and the transfer coefficients $S_{12}=S_{21}$, $S_{13}=S_{31}$, $S_{23}=S_{32}$ are measured during the sweep and s-net power efficiency is determined as (for port I for example), as:

$$\eta_1 = 1-(\text{Reflected power from port 1+coupled power to ports 2 and 3})/\text{Input power}.$$

The present inventor has found that under many operating regimes it is desirable to maximize certain criteria.

In a first embodiment of the invention, the maximum net power efficiency for each port is maximized, in the sense, that the net power efficiency at a point of maximum efficiency within the sweep range is made as high as possible. The efficiency and the frequency at which the efficiency is a maximum is noted. Optionally, the width of the efficiency peak and a Q-factor are noted as well.

A second embodiment of the invention is based on a similar criterion. For this embodiment the area under each resonance peak of the net efficiency of transfer is determined. This area should be a maximum. The efficiency, the center frequency of the resonance having the maximum area and its width are noted.

In an embodiment of the invention, the criteria for determining if the variables are properly set is when the peak net efficiency (first embodiment) or the area or a width (second embodiment) is above some predetermined level or a Q-factor is below some predetermined level. For example, there may be a restriction that the area above 60% net efficiency is maximized for each of the feeds.

It is noted that energy that is neither reflected nor transmitted to the other ports is absorbed either in the walls of the cavity or in the object being heated. Since absorption in the conducting walls is much lower than that in the object by a large factor, the net efficiency is approximated by the proportion of the input power that is absorbed in the object.

It is also noted that the frequency of maximum net efficiency is not necessarily the same as the frequency at which the match is best.

A search is performed for a position of the matching elements at which the net power efficiency at all of the feeds meets the criteria. This is indicated at boxes 156, 166, 168 and 172, which represent a search carried out by changing the positions and/or orientations of the matching elements. Standard search techniques can be used or a neural network or other learning system can be used, especially if the same type of object is heated repeatedly, as is common for industrial uses.

When the criteria are met 168—YES, then the power is raised to a level suitable for heating. The power into the respective amplifiers is optionally normalized to provide a same net power into the cavity (and therefore, into the object) for each port at Box 174. Optionally, the least efficient port determines the power to the object.

In an embodiment of the invention, the frequency is swept, optionally while adjusting the power. The term swept should be understood to include serial transmission of individual non-contiguous frequencies, and transmission of synthesized pulses having the desired frequency/power spectral content.

The present inventors have discovered that each frequency has maximal absorption at a specific location within an object within a cavity, which locations may vary between different frequencies. Therefore sweeping a range of frequencies may cause movement of the peak heating region within the object, Computer simulations have shown that, at least when the Q factor of a peak is low (i.e., a lot of energy is dissipated in the object being heated) the movement of the peak heating region can be quite substantial. Furthermore, the inventors have found that each mode (represented by a different peak of efficiency) acts differently when swept.

Figure 11A:
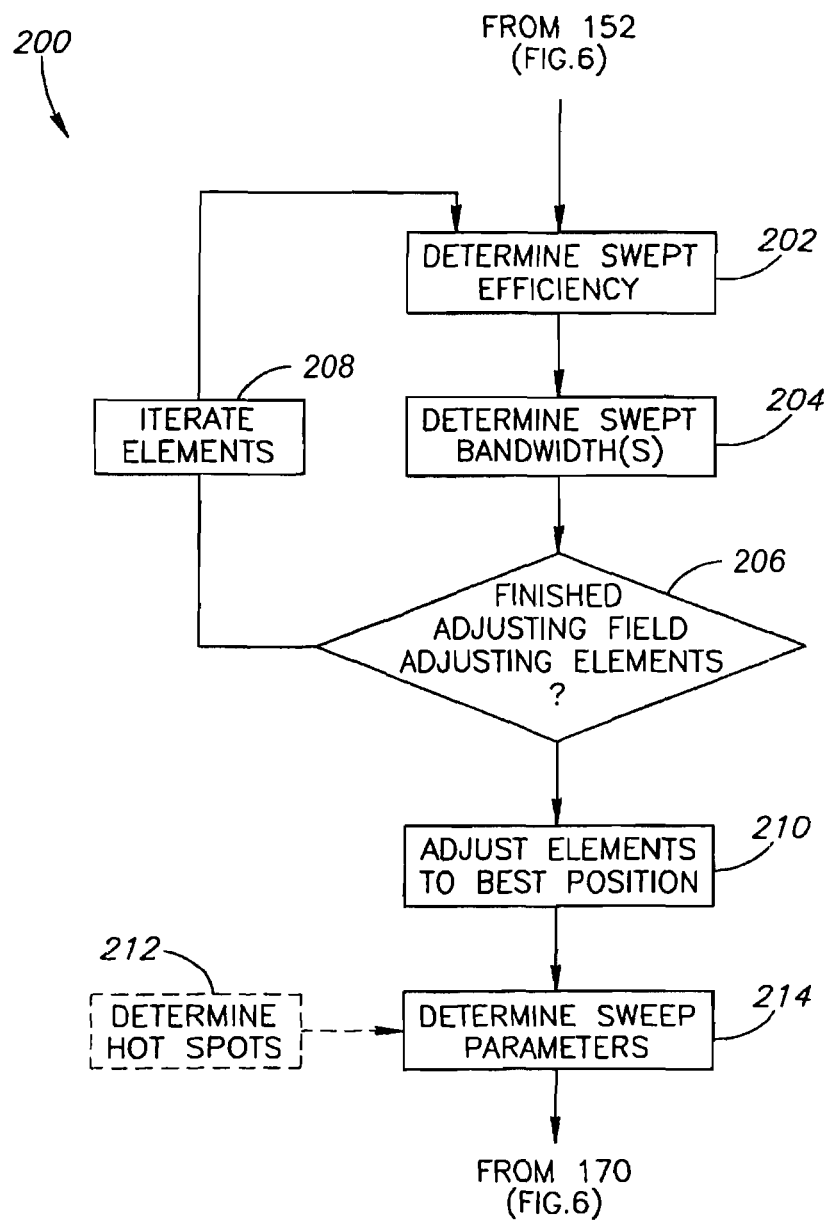
FIG. 11A is a simplified flow chart of a method of determining swept power characteristics, in accordance with an embodiment of the invention.

FIG. 11A is a simplified flow chart 200 of a method of determining swept power characteristics, in accordance with an embodiment of the invention. This method corresponds to acts 160 and 158 of the flow chart of FIG. 6.

After placing the object in the cavity (152) the cavity is swept to determine the input efficiency as a function of frequency (202) (e.g., obtain a spectral image). Determination of input efficiency is described in detail above. Alternatively, a pulse of energy, having a broad spectrum in the range of interest is fed into the input. The reflected energy and the energy transmitted to other inputs are determined and their spectrums are analyzed, for example using Fourier analysis. Using either method, the net power efficiency as a function of frequency can be determined.

Under some conditions, where similar objects have been heated previously, a set of tables for different types and sized of objects can be developed and used as a short-cut instead of closely spaced measurements.

Figure 11B:
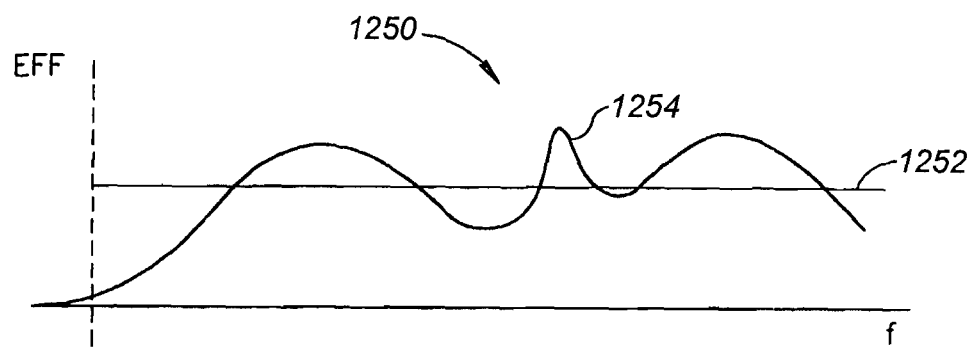
FIGS. 11B and 11C illustrate how a swept efficiency spectrum is determined, in accordance with an embodiment of the invention.

FIG. 11B shows a simplified net power efficiency curve 1250 at an input. It is noted that there are regions in which the efficiency is high and others in which the efficiency is low. Furthermore, some of the efficiency peaks are broader and others are narrower.

Next, the overall swept bandwidth (BW) is determined (204). This may include sweeping across a single peak or across several peaks.

In an embodiment of the invention, during the heating phase, the frequency is swept across a portion of each of the high efficiency peaks. For example, to provide even heating of objects it is believed that the power inputted to the cavity at each frequency should be the same. Thus, in an embodiment of the invention, the power at each frequency is adjusted such that P*η is a constant for all the frequencies in the sweep. Since the power available is always limited to some value, this may set a limit on the available bandwidth for the sweep. An example of a lower limit to efficiency is shown as dashed line 1252 in FIG. 11B. The sweep may be limited to frequencies having efficiency above this value.

Next, the positions of the field adjusting elements are set. This adjustment is optional and in some situations, even where such elements are present, they do not need to be adjusted. In general, the criterion for such adjustment is that the peaks have as high efficiency as possible with as broad a peak as possible Specific applications may introduce additional goals, such as moving the peak to a certain band.

An iterative process (206, 208) is used to determine a desired position and/or orientation of the field adjusting elements. When the search process which may be any iteration process as known in the art, is completed the elements are set to the best position found. (210).

In an embodiment of the invention, the sweep is adjusted (212) to avoid feeding excess power into certain parts of the object. For example, if the object contains a metal rod or a metal zipper, a high peak in efficiency 1254 may be generated. A metal rod can cause a concentration of energy near the ends of the rod. Avoiding irradiation at this peak can sometimes reduce the effects of such objects on even heating.

Next, the sweep parameters are determined (214).

Figure 11C:
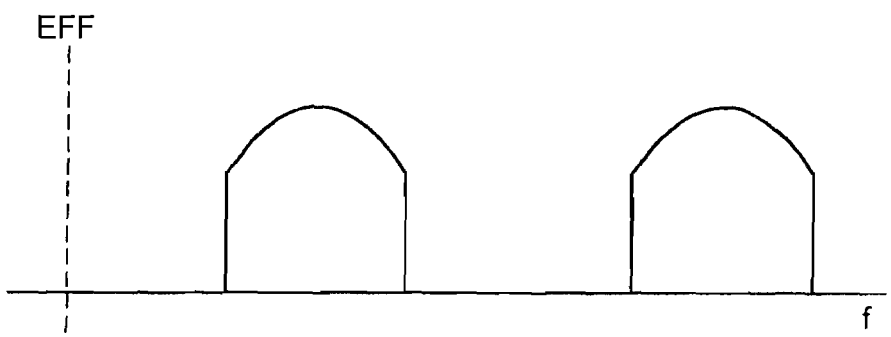
Figure 11D:
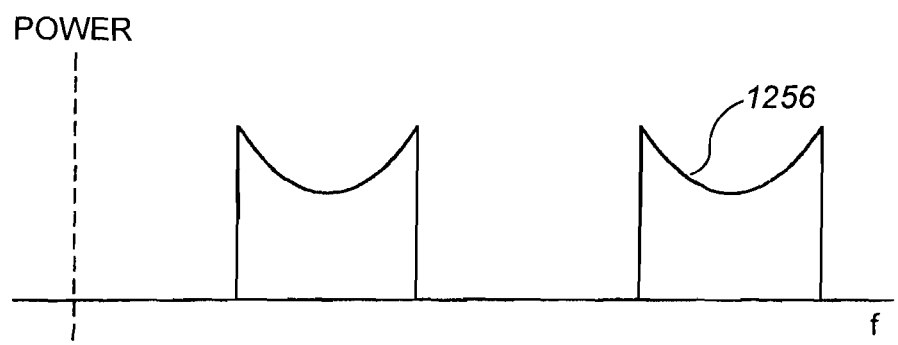
FIG. 11D shows a pulse shape, power spectrum for a pulse operative to provide the spectrums shown in FIGS. 11B and 11C, in accordance with an embodiment of the invention.

FIG. 11D shows the power spectrum 1256 of energy to be fed to the input, in accordance with an embodiment of the invention. It should be noted that no energy is transmitted at the frequency characteristic of the rod and that for other frequencies for which the efficiency is above the minimum shown at 1252 in FIG. 11B, as illustrated in FIG. 11C. The power has a shape that is such that the product of the efficiency η and the power fed is substantially constant.

In an alternative embodiment of the invention, the energy is fed to the port in the form of a pulse rather than as swept energy. First a pulse, such as that shown in FIG. 11D is generated by a pulse synthesizer. This pulse is amplified and fed into the input. The pulse synthesizer would then replace VCO 102 (FIG. 5B). It is understood that the pulse synthesizer can also be programmed to produce a sweep for use in determining the frequency dependence of η (act 164 of FIG. 7).

When the criteria are met, then the power is raised to a level suitable for heating and optionally swept. The power into the respective amplifiers is optionally normalized to provide a same net power into the cavity (and therefore, into the object) for each port. Optionally, the least efficient port determines the power to the object. While in prior art ovens, the user decides on the heating time, in some embodiments of the present invention the desired heating time can generally be predicted.

Returning again to FIG. 6, there are a number of methodologies for performing the heating 170.

In one embodiment of the invention, power is fed to all of the feeds at the same time. This has the advantage that heating is faster. It has the disadvantage that three separate sets of circuitry are needed.

In a second embodiment of the invention, the power is fed to the feeds seriatim, for short periods. Potentially, only a single set of most of the circuitry is needed, with a switch being used to transfer the power from feed to feed. However, for calibration, a method of measuring the power transmitted from port to port should be provided. This circuitry could also be used to match the feeds when power is not being fed to them. A different type of circuitry for providing both the heating and calibration functionality, in accordance with an embodiment of the invention, is shown in FIG. 8, corresponding to the circuitry of FIG. 5B.

The same reference numbers are used in FIG. 8 as for FIG. 5B, except as indicated below. Such a system has the advantage of being much less expensive. It is, of course, slower. However, it does allow for an additional method of equalization, in which the time duration (either alone or in conjunction with changing the input power) during which each feed is fed is adjusted so that the energy into each feed is the same (or different if that is desired).

Figure 8:
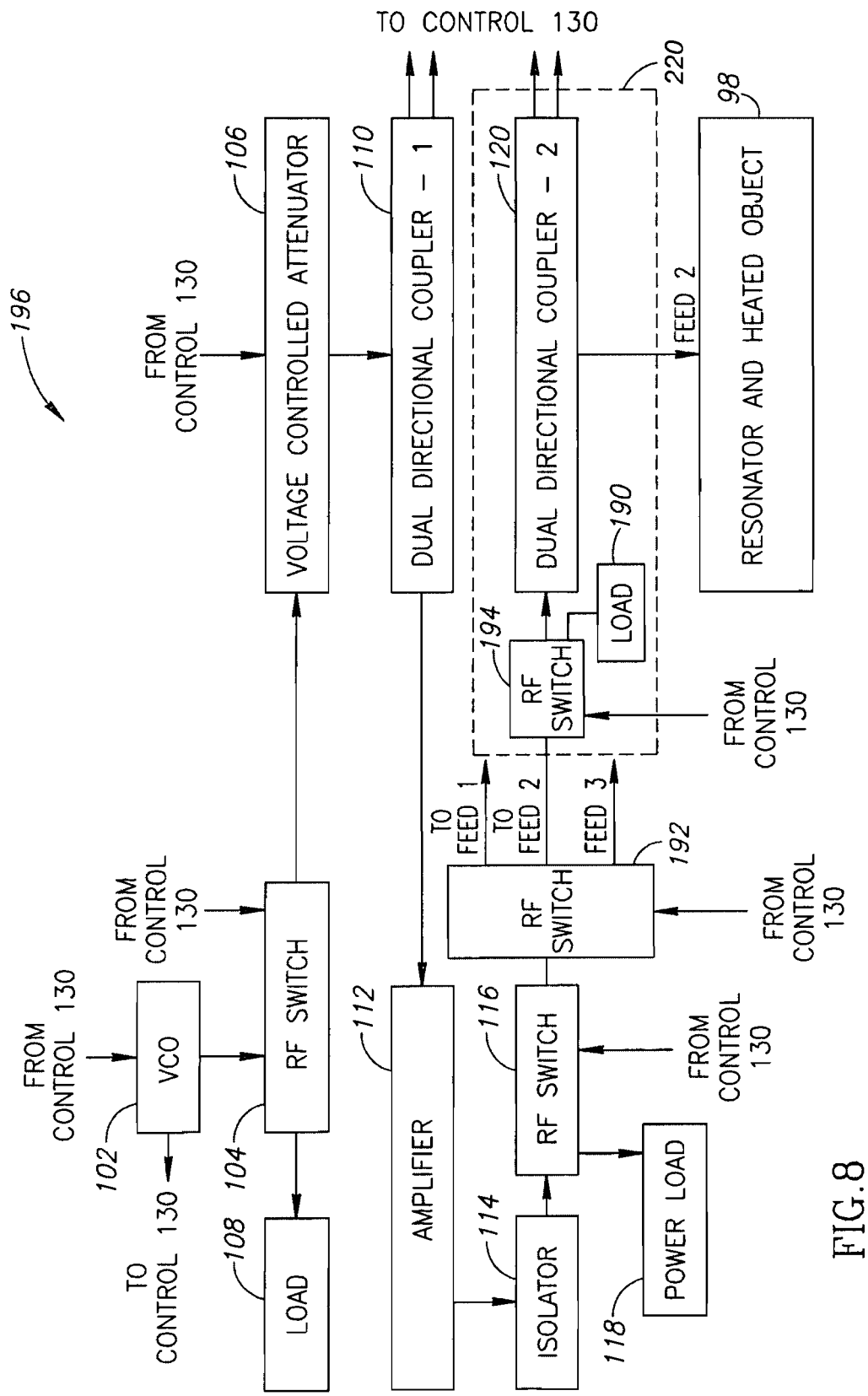
FIG. 8 illustrates alternative RF circuitry, in accordance with an embodiment of the invention.

FIG. 8 is similar to FIG. 5B up to the output of RF switch 116. Following RF switch 116 a second RF switch 192 transfers the power delivered by amplifier to one of the feeds. Only circuitry 220 related to feed 2 is shown.

Circuitry 220 operates in one of two modes. In a power transfer mode, a signal from control 130 switches power from RF switch 192 to dual directional coupler 120, via an RF switch 194. The rest of the operation of the port is as described above. In a passive mode, the input to RF switch 194 does not receive power from amplifier 112. Switch 194 connects a load 190 to the input of dual directional coupler 120. In the passive mode, load 190 absorbs power that is fed from the cavity into the feed. For production systems additional simplification of directional coupler 120 may be possible, replacing the dual directional coupler with a single directional coupler.

It should be noted that switches 116 and 192 and optionally the local switches can be combined into a more complex switch network. Alternatively or additionally, RF switch 194 can be replaced by circulator such that power returned from the feed is always dumped in load 190.

In either the embodiment of FIG. 5B or the embodiment of FIG. 8, the frequency of the power fed to a port can be fed at the center frequency of the resonance mode that couples the highest net power, i.e., the point of maximum efficiency of energy transfer to the object being heated. Alternatively, the frequency can be swept across the width of the resonance or, more preferably along a portion of the width, for example between the −3 dB points of the power efficiency curve, or as described above with respect to FIGS. 11A-11C. As indicated above, optionally, the power is adjusted during this sweep so that the net input power remains constant or more nearly constant during the sweep. This can be accomplished by changing the power amplification of the power amplifier inversely to the power efficiency of the instantaneous frequency being fed.

Figure 9:
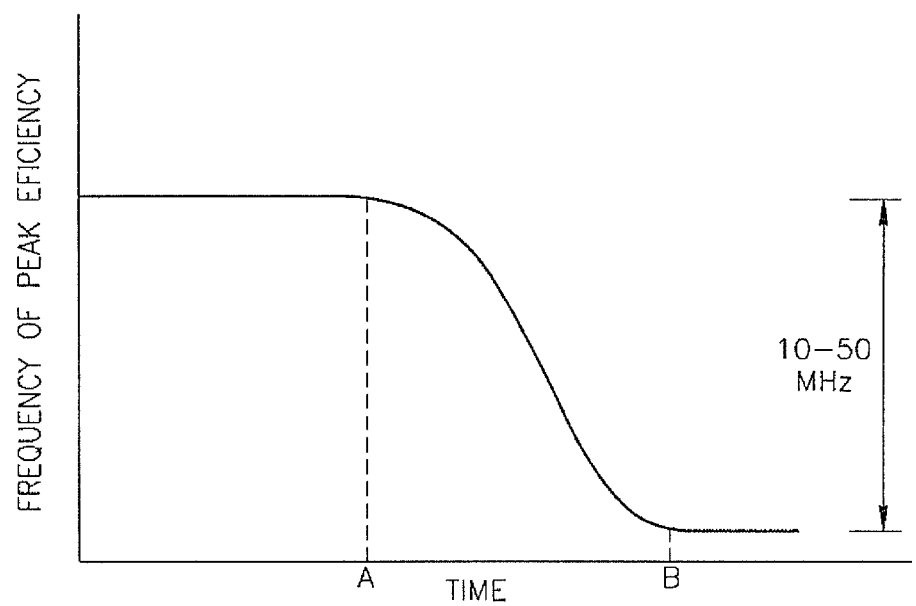
FIG. 9 is a graph of frequency vs. time for a typical thawing process, illustrating an automatic turn-off capability in accordance with an embodiment of the invention.

Returning again to FIG. 6, reference is additionally made to FIG. 9, which shows a graph of frequency of a particular peak with time for a typical thawing process. This graph illustrates one method of using the changes in the properties of the object during a thawing process to determine when the process is complete.

The ordinate of FIG. 9 is the frequency chosen as an input for one of the feeds. The abscissa is time. During thawing of an object, the ice in the object turns to water. Ice and water have different absorption for microwave or UHF energy, resulting in a different return loss and coupling as a function of frequency. Not only does this change the match, but at least after rematching by adjustment of the matching elements, the frequency of the absorption efficiency peak changes. At point A, some of the ice has started to change into water and the frequency of match changes. At point B, all of the ice has changed to water and the frequency of match stops changing. By monitoring the frequency described above and especially its rate of change, the point at which all of the ice is turned into water can be determined and the heating terminated, if only thawing is desired. It is noted that the frequency change during thawing is large, as described herein, compared to allowed frequency changes in the prior art.

One of the problems of thawing a solid mass of irregular shape and irregular internal structure is that it is generally impossible to determine when all of the ice has been turned to water. Thus, in general, in the prior art, one overheats to assure that no ice is left, which, considering the uneven heating of the prior art, would enhance re-crystallization, if any were left.

Heating methods and apparatus of the present invention, which allow for both even heating and provide knowledge of the progress of the thawing, can result in much lower or even non-existent re-crystallization.

Apparatus and method according to the present invention have been used to defrost a pig's liver, Sushi or Maki and to cook an egg in the shell.

The following table shows a comparison of thawing of a cow liver by the system of the present invention and using a conventional microwave oven.

TABLE 1

Comparison of Inventive Method and Conventional Microwave-Cow Liver

| Measurement | Inventive Method | Conventional Microwave |
|---|---|---|
| Initial Temperature | −50° C. | −50° C. |
| Final Temperature after thawing | 8° C. to 10° C. | −2° C. to 80° C. |
| Power | 400 Watt | 800 Watt |
| Thawing time | 2 Minutes | 4 Minutes |
| Visible damage | None | The texture of the thawed sample was destroyed. There are frozen regions along side burned ones. No chance of survival of living cells. |

The following table shows a comparison between thawing of Maki containing raw fish covered by rice and wrapped in seaweed, by the system of the present invention and using a conventional microwave oven.

TABLE 2

Comparison of Inventive Method and Conventional Microwave-Maki

| Conventional Microwave | Inventive Method | Measurement |
|---|---|---|
| −80° C. | −80° C. | Initial Temperature |
| −5° C. to 60° C. | 2° C. to 6° C. | Final Temperature after thawing |
| 800 Watt | 400 Watt | Power |
| 1 Minute | 40 Seconds | Thawing time |
| The thawing process cooked part of the salmon, therefore it was not Maki anymore. | None | Visible damage |

An egg was cooked using the present method. Generally, eggs burst if an attempt is made to cook them in a microwave oven. However, using the system described above an egg in the shell was cooked. The white and yellow were both well cooked, and the white was not harder than the yellow. Neither part was dried out or rubbery and the taste was very good, with little if any difference from a conventional hard cooked egg. In addition, deep frozen fish have been defrosted without leaving any frozen portions and without any portions being heated above cooking temperatures.

In each of the above experiments, the frequency and power were adjusted automatically and the matching elements were adjusted manually, in accordance with the method given above for automatic adjustment.

The inventors believe that the methodology of the present invention is capable of thawing objects that are deep frozen to just above freezing with a temperature variation of less than 40° C., optionally less than 10° C., 5° C. and even as low a difference as 2° C. Such results have been achieved in experiments carried out by the inventors, for a cow liver, for example.

Thawing objects such as meat and fish with such low differences and at high speed has the potential for prevention of development of *salmonella*, botulism and other food poisons. Controlled, uniform thawing has important implications in thawing organs for transplanting, without tissue destruction.

Figure 10:
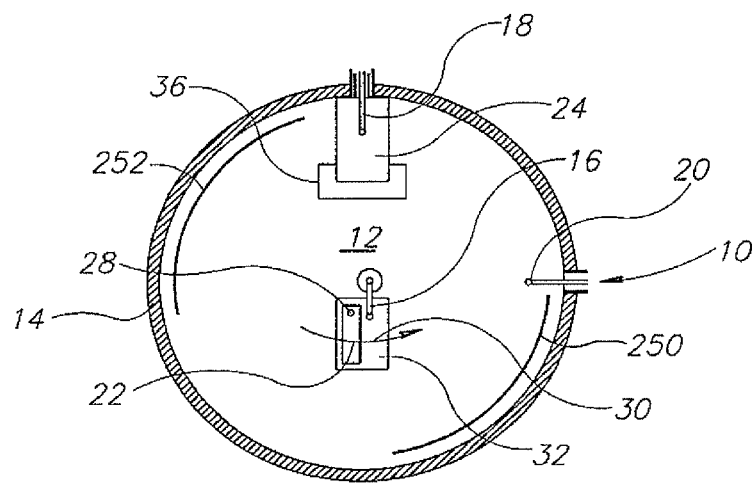
FIG. 10 shows the layout of a low frequency bias structure, in accordance with an embodiment of the invention.

FIG. 10 shows apparatus for applying a DC or relatively low frequency (up to 100 kHz or 100 MHz) to an object in the cavity, in accordance with an embodiment of the invention. This figure is similar to FIG. 1, except that the cavity includes two plates 250 and 252. A power supply (not shown) electrifies the plates with a high differential voltage at DC or relatively low frequency. The objective of this low frequency field is to reduce the rotation of the water molecules. Ice is water in a solid state therefore its rotational modes are restricted. A goal is to restrict the rotational modes of the liquid water in order to make the heating rate be determined by that of the ice. The present inventors also believe that the low frequency fields may change the dielectric constant of the materials making up the object being heated, allowing for better match of the input to the object.

In an alternative embodiment of the invention a DC or low frequency magnetic field is applied by placing one or more coils inside or preferably outside the cavity to cause alignment of the molecules in the object. It is possible to combine low frequency or DC electric and low frequency or DC magnetic fields with possible different phases from different directions.

Figure 12A:
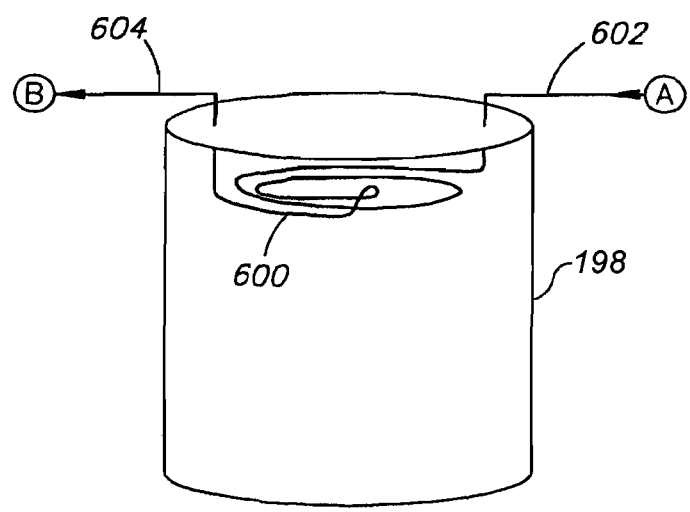
FIG. 12A shows an RF heater with an auxiliary heating coil, in accordance with an embodiment of the invention.

FIG. 12A shows a cavity 198 with an internal heater coil 600 placed inside the cavity. An inlet 602 and an outlet 604 allow for feeding a hot fluid through the coil to heat the air within the cavity.

Figure 12B:
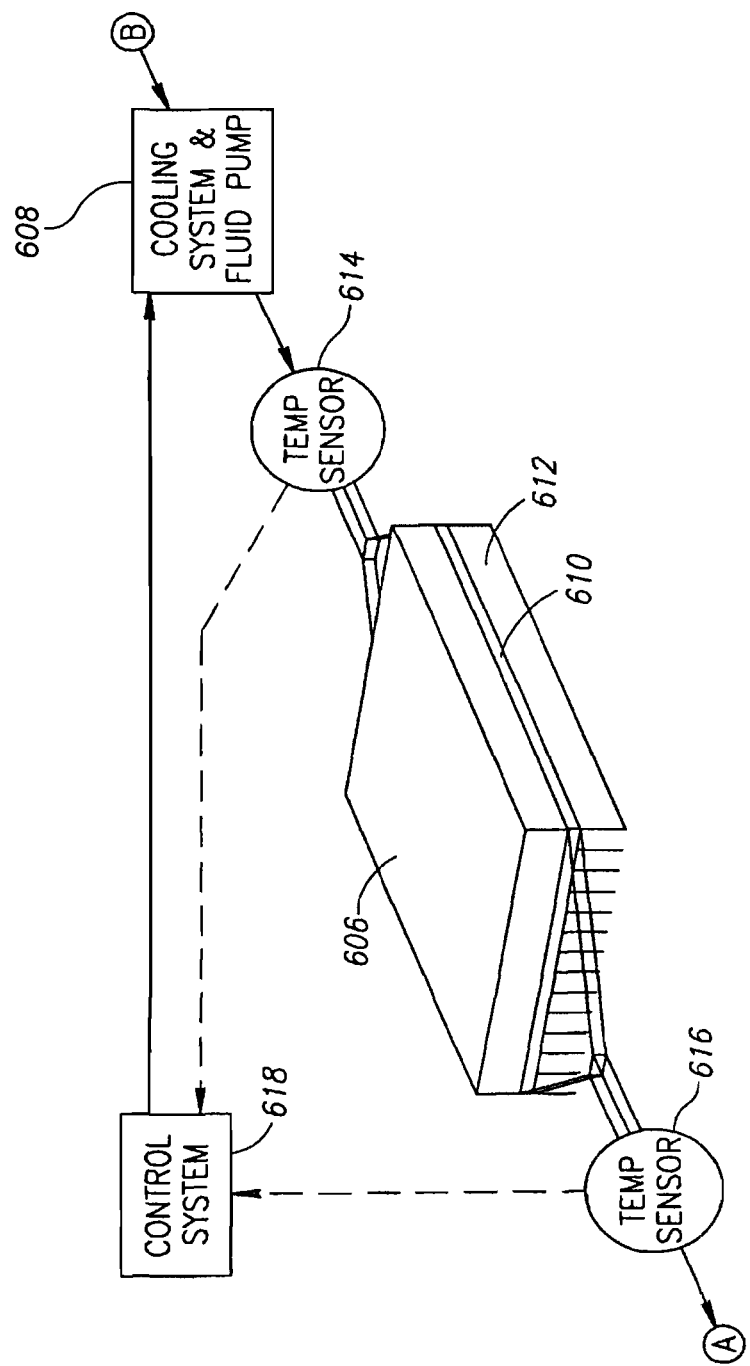
FIGS. 12B and 12C schematically illustrate a scheme for transferring waste heat from an amplifier to the heater of FIG. 12A.
Figure 12C:
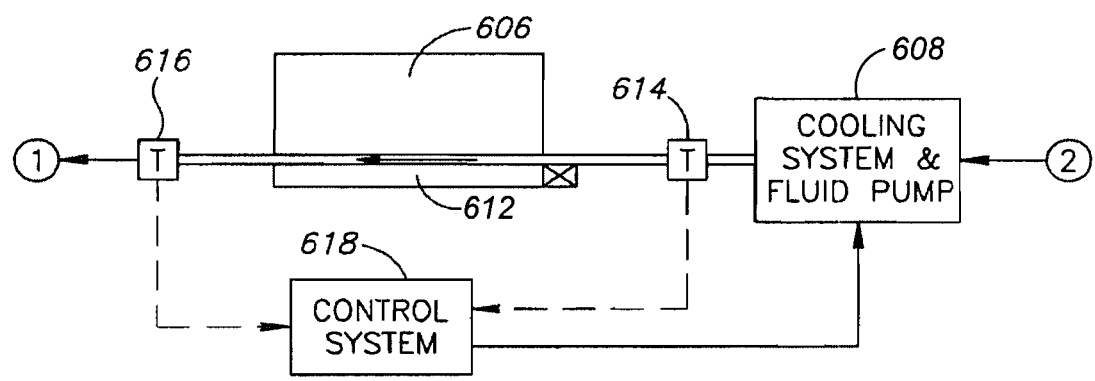

FIGS. 12B and 12C show two schematic illustrations of a system for transferring heat from a high power amplifier 606 to the coil. Even at an efficiency of 60%, the amplifier can generate several hundred watts. This energy (or at least a part of it) can be transferred to heat the air and to produce infrared radiation (as a resistive coil does) in the cavity to increase the efficiency of heating.

FIG. 12B shows a very schematic diagram to illustrate how waste heat from an amplifier 606 can be captured. FIG. 12C shows a block diagram of the same system. Element 608 represents a cooling system for returning fluid and a fluid pumping system. It receives return fluid from outlet 604, cools the liquid (if necessary) and pumps the liquid into a gap 610 between the between amplifier 606 and an optional heat sink 612. The temperature at the input to the gap and at its output are preferably measured by sensors 614 and 616 and fed to a control system 618, which controls one and optionally more than one of the cooling and pumping rate to provide a desired heat transfer to the cavity. A fan may be provided to cool the heat sink as necessary. The fluid passing between the amplifier and the heat sink also functions to transfer heat from the amplifier and the heat sink.

Optionally heat conducting rigs may transfer heat between the amplifier and the heat sink with the fluid passing between the ribs to collect heat.

Alternatively, heat pipes or other means can be used to collect and transfer energy to the cavity. Alternatively, hot air could be passed over the amplifier and/or heat sink and passed into the cavity.

Use of high efficiency amplifiers with or without heat transfer to the cavity can result in highly efficient systems, with an overall efficiency of 40-50% or more. Since amplifiers with relatively high (40V-75V) voltages are used, the need for large transformers is obviated and heat sinks can be small or even no-existent, with the amplifier transferring heat to the housing of the heater.

Figure 12D:
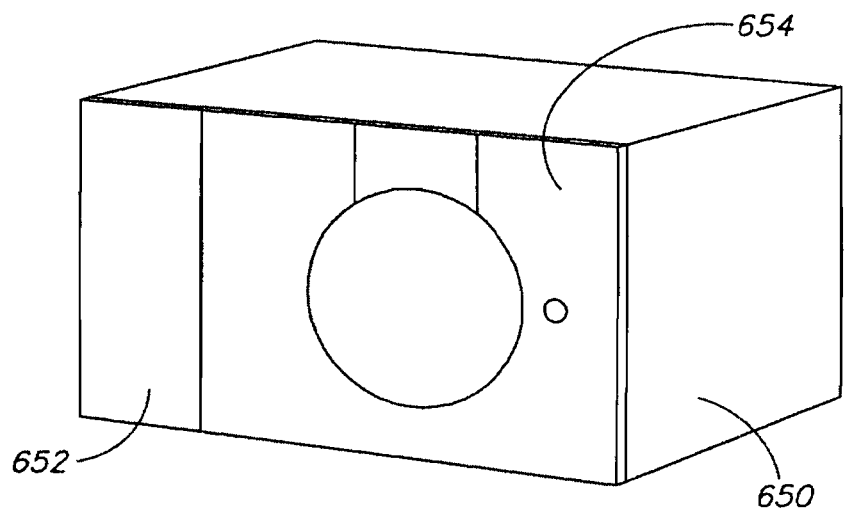
FIG. 12D shows an external view of a low weight, high efficiency RF heater, in accordance with an embodiment of the invention.

By optimizing the system, a heater as shown in FIG. 12D, including a housing 650, amplifiers and controller, as well as a user interface 652 and a door 654, as normally found on a microwave oven can weigh as little as 10 or 15 Kg or less.

While applicants have utilized UHF frequencies for heating in the examples described above, rather than the much higher 2.45 GHz used in the prior art, for heating applications other than thawing, a different frequency may be desirable. UHF frequencies are absorbed preferentially by ice and have a longer wavelength than the higher frequencies, so that the fields within the object are more uniform and the ice is preferentially heated as compared to the water. This provides for preferential heating of the ice and more even thawing.

Additional measures that may be taken to improve the uniformity are:

1) Various types and sizes of conducting materials such as tiny grains of powdered conductive material (gold) may be inserted into the sample preceding the freezing process (e.g. through the circulation of the blood or cooling fluid) and serve as reflecting sources. The insertion can be done using some template of non-conducting material (absorbing or not) holding the conducting objects. These passive energy sources can improve the uniformity of EM radiation absorption.

2) Penetration of materials that change their dielectric characteristics dependent upon temperature in a fashion that is different than that of the sample. Injecting these materials will enable changes in the dielectric characteristics of the sample in the direction desired for achieving uniform and fast warming.

3) Use of probes for measurement of various parameters of the warming process such as temperature, pressure, and so on: These probes can be inserted inside the sample preceding the freezing process or attached adjacent to the sample at any stage of the process. Measurement of these parameters provides a means for supervision (control) of the warming process such that if the warming is not optimal it will be possible to make changes in various parameters of the process. There are probes available that are suited for measurement during warming in a microwave device. These probes can also serve as an indication of when to stop a thawing or cooking process.

Such probes may be included in a bag in which the object to be heated is placed and may include a resonant element whose resonant frequency is made to vary with temperature by the inclusion of a temperature dependent element such as a temperature dependent resistor or capacitor.

Probes may be provided with resonant circuits whose frequency depends on temperature. Such probes may be scanned during the scanning used for setting sweep parameters to determine temperature. During power transfer, these frequencies should generally be avoided. In an embodiment of the invention, a temperature sensitive tag is paired with a temperature insensitive tag and the changes in the frequency of the temperature sensitive tag are determined by a difference frequency between the two. This allows for a more accurate measurement of temperature that utilizing an absolute measurement of the frequency of the temperature sensitive tag.

4) Wrapping of the sample in material that does not absorb EM radiation at the specified frequencies: This type of wrapping can serve as packaging for the sample during transportation and as part of the probe system by which it is possible to measure temperature and additional parameters at the edges of the sample. This wrapping can serve as local refrigeration for the outer surfaces of the sample (which usually have a tendency to warm faster than the rest of the sample) in order to achieve uniformity in the warming of the sample.

Further, the wrapping can include identification of the object to help track the object and also to provide an indication to the system of a preferred protocol for heating the object. For example the wrapping may be provided with a number of resonant elements which can be detected when the cavity is swept during calibration. The frequencies of the elements can be used to provide an indication of the identity of the object. This allows for the automatic or semi-automatic setting of the starting parameters for calibration and/or for a particular heating protocol, optimized for the particular object and conditions.

Alternatively or additionally, to resonant circuits, a recording/storage element of a different type is provided, for example, in the form of an RFID element or a bar-code, which includes thereon an indication of the content of a package or wrapper including the object, suggested treatment thereof and/or heating instructions. In an exemplary embodiment of the invention, the instructions are actually provided at a remote site, indexed to a key stored by the recording element. Such instructions may be, for example, stored in a table or generated according to a request, based on information associated with the identification.

A reader is optionally provided in the heater, for example, an RFID reader or a bar-code reader to read information off a package or a wrapper thereof.

In an exemplary embodiment of the invention, after the object is prepared, various types of information are optionally stored on (or in association with) the recording element, for example, size, weight, type of packing and/or cooking/thawing/heating instructions.

In an exemplary embodiment of the invention, the recording element has stored therewith specific cooking instructions. Alternatively or additionally, the recording element has stored therein information regarding the platter shape and/or dielectric properties of its contents. It is noted that for industrial shaped portions, if the shape of the food is relatively regular between platters, movement of the food and/or changes in size and/or small changes in shape will not generally affect the uniformity by too much, for example, shifting a heating region/boundary by 1-2 cm. Optionally, the platter includes a depression and/or other geometrical structures which urge the food item to maintain a desired position relative to the platter borders.

During heating of the food, the parameters of the heating are optionally varied. The effect of the varying may cause non-uniformity in space and/or in time. In an exemplary embodiment of the invention, a script is provided which defines how and what to vary. Optionally, the script includes decisions made according to time (e.g., estimation of an effect) and/or food state (e.g., measurement). Various measuring methods are described above. Estimation is optionally based on a simulation or on empirical results from previous heating cycles. Optionally, the script is conditional (e.g., modified, generated and/or selected), for example, based on the position of a platter in the oven and/or personal preferences (which may be stored by the oven).

In an exemplary embodiment of the invention, a script is provided on the recording element or at a remote location. Optionally, a script is selected by a user selecting a desired heating effect.

In one example, a single food item may experience different power levels for different times, in order to achieve a desired texture/flavor.

In an exemplary embodiment of the invention, a script is used to set different energy levels and/or different times to apply such energies.

In one example, a script is as follows:
(a) Heat all platter so that the food reaches a relatively uniform temperature of 5 degrees Celsius.
(b) Uniformly heat whole platter at 80% for 5 minutes and then full power for 10 minutes.
(c) Heat to 40 degrees Celsius.
(d) Maintain heat for 10 minutes. It is noted that a desired heat can optionally be maintained by estimating the energy absorption while applying a known amount of cooling. Alternatively, actual heat absorption may be estimated based on a known amount of energy absorption and a measurement of air temperature leaving the cavity. Optionally, the oven includes a source of cooling air and/or has coolable walls and/or tray.
(e) Reduce heat to 30 degrees Celsius.
(f) Wait 10 minutes.
(g) Report "done" but leave at 30 degrees Celsius until removed.

In an exemplary embodiment of the invention, the script includes other conditions, for example, detecting changes in color (e.g., browning), steaming (e.g., by phase change of water), volume (e.g., dough rising will change the behavior of the cavity in ways that can be anticipated).

Optionally, the script includes a request to the user to add ingredients (e.g., spices), or to mix or reposition object.

In an exemplary embodiment of the invention, the script takes into account the quality of uniformity control achievable by the oven. For example, if a higher level of uniformity is desired than basically provided by the oven, heating may include pauses where power is reduced, to allow heat to even out in the object. The length of the delays is optionally pre-calculated for the food substances and a calibrated lack of uniformity of the oven. Alternatively or additionally to reducing power, the food and/or the heating areas may be moved one relative to the other so as to better distribute heating.

In an exemplary embodiment of the invention, no script is provided. Instead, the heating times and/or parameters are based directly on the desired results, measured food properties and/or measured heating properties. Such desired results may be user provided or indicated by the recordable element.

5) Liquid injection: (similar to cooling liquid) that is suitable for a biological sample, the purpose of which is to cause uniform warming: This liquid is used in the field of hyperthermia. In this field warming of a biological area is done in order to remove a cancerous growth. From knowledge derived from this field it is possible to understand that a liquid such as this can cause a drastic change in the warming uniformity and can enable use of a warming device that is more simplified than would be required without its use.

6) Penetration of active radiation sources in the sample during the freezing process: These sources are active, which means connected to an external supply line that will be used as a source of EM radiation that will emanate from within the sample.

The present invention has been described partly in the context of thawing. The inventors believe that based on the results shown above, it can be expected that the methods of the present invention, can be used for baking and cooking, areas in which conventional microwave ovens are notoriously weak or for other heating operations, especially those for which a high level of uniformity or control is needed and/or in which a phase change takes place.

Utilizing various embodiments of the invention, the UHF or microwave energy may be deposited uniformly in an object to within less than ±10%, ±20% or ±30% over 80% or 90% or more of the object.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

Furthermore, the terms "comprise," include," and "have" or their conjugates shall mean: "including but not necessarily limited to."

The scope of the invention is limited only by the following claims:

1. A method of electromagnetic heating an object in a cavity, the method comprising:
feeding UHF or microwave energy into the cavity via a plurality of feeds;
determining an efficiency of net transfer of energy into the cavity for each of the plurality of feeds as a function of frequency over a range of frequencies; and
adjusting the frequencies of the energy fed into the cavity, responsive to the determined efficiency of net transfer of energy into the cavity for each of the plurality of feeds;
wherein the method includes adjusting power at each feed, responsive to the determined efficiency of net transfer of energy into the cavity for each of the plurality of feeds, as the frequencies of the energy fed into the cavity are adjusted.

2. A method of electromagnetic heating of an object in a cavity, the method comprising:
feeding UHF or microwave radiation into the cavity for heating the object;
changing a frequency of the UHF or microwave radiation fed into the cavity by at least 1 MHz during the course of the heating; and
adjusting, for each frequency, a power level of the UHF or microwave radiation fed into the cavity, wherein
the change in the frequency of the UHF or microwave radiation is determined based on a measurement of net efficiency of energy transfer to the cavity over a band of frequencies, and
the power level of the UHF or microwave radiation is adjusted for each frequency responsive to the measurement of the net efficiency of energy transfer to the cavity over a band of frequencies.

3. The method of claim 2, wherein the net efficiency is approximated by a proportion of input power that is absorbed in the object.

4. The method of claim 3, wherein the net efficiency is approximated by a proportion of input power that is not output from the cavity through the feeds.

5. The method of claim 2, wherein the frequency of the UHF or microwave radiation fed into the cavity for heating the object is fed via a plurality of feeds.

6. The method of claim 5, wherein a net efficiency of energy transfer into the object to be heated, as compared to an amount of energy provided to the plurality of feeds, is greater than 40%.

7. The method of claim 5, wherein the frequencies fed at the same time to two of the feeds differ by at least 8 MHz.

8. The method of claim 2, wherein a controller is configured to determine the net efficiency of energy transfer to the cavity and cause adjustment of the frequency.

9. The method of claim 8, wherein the controller is configured to cause the adjustment of the frequency during a period between commencement and ending of heating.

10. The method of claim 8, wherein the controller is configured to cause feeding of the UHF or microwave radiation into the cavity at two or more different frequencies, each being associated with a different power level of the UHF or microwave radiation.

11. The method of claim 8, wherein the controller is configured to cause the adjustment of the frequency as heating proceeds.

12. A method to control one or more characteristics of a process of heating an object in a cavity based on measurement of energy absorption efficiency, wherein the method comprises:

measuring an efficiency of energy absorption into the object as a function of frequency; and adjusting an input power level associated with each of a plurality of transmitted frequencies based on the measured efficiency of energy absorption into the object.

13. The method of claim 12, wherein the efficiency of energy absorption into the object is approximated based on a proportion of input energy that is absorbed in the object.

14. The method of claim 12, wherein the transmitted frequencies are supplied via a plurality of feeds.

15. The method of claim 14, wherein the net efficiency is approximated by a proportion of input power that is not output from the cavity through the feeds.

16. The method of claim 14, wherein the efficiency of energy absorption into the object to be heated, as compared to an amount of energy provided to the plurality of feeds, is greater than 40%.

17. The method of claim 14, wherein the transmitted frequencies supplied at any given time by at least two of the plurality of feeds differ by at least 8 MHz.

18. The method of claim 12, wherein a controller is configured to determine the efficiency of energy absorption into the object and to cause adjustment of the input power level at each of the plurality of transmitted frequencies.

19. The method of claim 18, wherein the controller is further configured to cause the adjustment of the input power level at each of the plurality of transmitted frequencies during a period between commencement and ending of heating.

20. The method of claim 18, wherein the controller is configured to cause the adjustment of the input power level at each of the plurality of transmitted frequencies as heating proceeds.

* * * * *